US012598004B2

(12) United States Patent
Kobayashi et al.

(10) Patent No.: US 12,598,004 B2
(45) Date of Patent: Apr. 7, 2026

(54) UNDERWATER OPTICAL WIRELESS COMMUNICATION DEVICE AND UNDERWATER OPTICAL WIRELESS COMMUNICATION SYSTEM

(71) Applicant: Shimadzu Corporation, Kyoto (JP)

(72) Inventors: Yutaka Kobayashi, Kyoto (JP); Shunji Murakawa, Kyoto (JP); Keita Nakagawa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 18/111,388

(22) Filed: Feb. 17, 2023

(65) Prior Publication Data

US 2023/0379063 A1    Nov. 23, 2023

(30) Foreign Application Priority Data

May 17, 2022    (JP) ................................. 2022-081125

(51) Int. Cl.
*H04B 10/80*          (2013.01)
(52) U.S. Cl.
CPC .................................... *H04B 10/80* (2013.01)
(58) Field of Classification Search
CPC .................................................... H04B 10/80
See application file for complete search history.

(56) References Cited

U.S. PATENT DOCUMENTS

| | | | | | |
|---|---|---|---|---|---|
| 5,444,441 | A | * | 8/1995 | Sutton | ..................... G01S 7/497 398/104 |
| 2014/0363166 | A1 | * | 12/2014 | Lacovara | ............... G01V 1/226 398/104 |
| 2019/0305521 | A1 | * | 10/2019 | Nishi | ........................ H01S 5/02 |
| 2022/0337319 | A1 | | 10/2022 | Owaki | |

FOREIGN PATENT DOCUMENTS

| | | | | | |
|---|---|---|---|---|---|
| CN | 107508649 | A | * | 12/2017 | ............ H04J 3/0644 |
| EP | 3995869 | A1 | * | 5/2022 | ............ H04B 10/80 |
| JP | 2019-176046 | A | | 10/2019 | |
| JP | 2020-177174 | A | | 10/2020 | |
| WO | 2021/002093 | A1 | | 1/2021 | |

OTHER PUBLICATIONS

Extended European Search Report (EESR) dated Oct. 16, 2023 in the corresponding European patent application No. 23160864.7.
Official communication pursuant to Art. 94(3) EPC, issued by the European Patent Office on Oct. 10, 2025 in the corresponding European patent application No. 23160864.7.

* cited by examiner

*Primary Examiner* — Pranesh K Barua
(74) *Attorney, Agent, or Firm* — Muir Patent Law, PLLC

(57)          ABSTRACT

An underwater optical wireless communication device (first communication device) is an underwater optical wireless communication device for underwater optical wireless communication. It includes a first light emitter for emitting first light having a first wavelength included in a blue wavelength band as a center wavelength, a first light receiver for receiving second light having a second wavelength included in a green wavelength band as a center wavelength, and a noise suppression unit for suppressing noise caused by green light generated due to the first light.

14 Claims, 14 Drawing Sheets

Optical properties of absorptive green transmission filter

Optical properties of reflective blue transmission filter

First green noise light

Second green noise light

Third green noise light

Fourth green noise light

Driving signal and green light noise signal

FIG. 10A
Light receiving signal (including second light signal and green light noise signal)
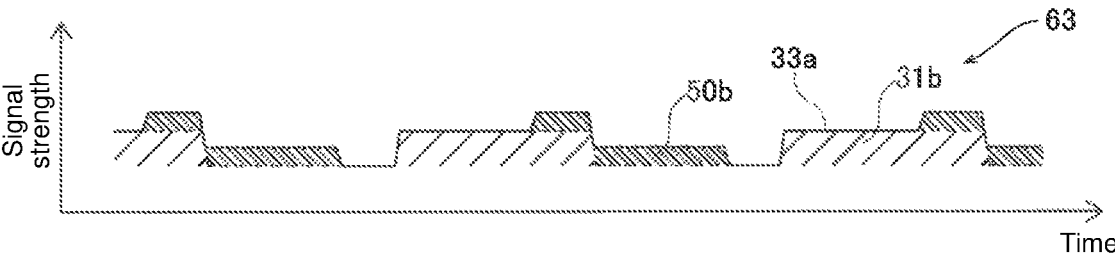
FIG. 10B
Compensation signal
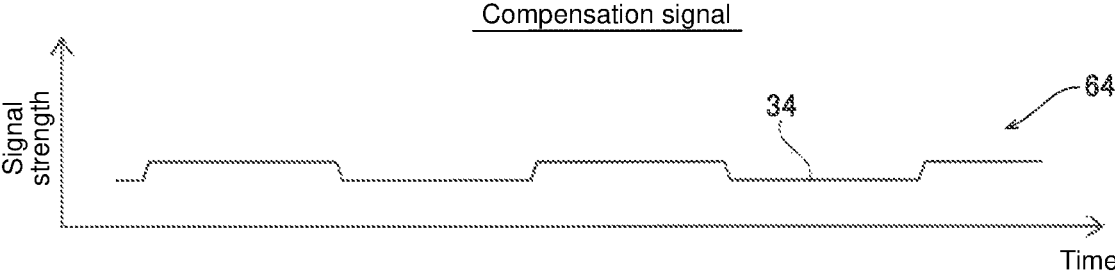
FIG. 10C
Light receiving signal (after green light noise signal removal)

Before fixation

After fixation

Calibration processing

Start

Emit first light ~101

Acquire a driving signal ~102

Acquire a green light noise signal ~103

Acquire a delay time ~104

Store the delay time ~105

Acquire waveform information on the green light noise signal ~106

Store the waveform information on the green light noise signal ~107

End

Green light noise signal removal processing

UNDERWATER OPTICAL WIRELESS COMMUNICATION DEVICE AND UNDERWATER OPTICAL WIRELESS COMMUNICATION SYSTEM

CROSS-REFERENCE TO RELATED APPLICATIONS

The priority application number JP2022-081125, entitled "Underwater Optical Wireless Communication Device, and Underwater Optical Wireless Communication System" filed on May 17, 2022, KOBAYASHI Yutaka, MURAKAWA Shunji, NAKAGAWA Keita, upon which this patent application is based is hereby incorporated by reference in its entirety.

BACKGROUND OF THE INVENTION

Field of the Invention

The present invention relates to an underwater optical wireless communication device and an underwater optical wireless communication system, and more particularly to an underwater optical wireless communication device and an underwater optical wireless communication system for bi-directional underwater optical wireless communication.

Description of the Related Art

The following description sets forth the inventors' knowledge of related art and problems therein and should not be construed as an admission of knowledge in the prior art.

Conventionally, an underwater optical wireless communication device that performs bidirectional optical wireless communication in water is known. Such an underwater radio communication device is disclosed, for example, in WO 2021/002093.

WO 2021/002093 discloses an underwater optical communication system provided with a first optical wireless communication device and a second optical wireless communication device. The first optical wireless communication device disclosed in WO2021/002093 is configured to emit blue signal light and receive green signal light.

The second optical wireless communication device disclosed in WO2021/002093 is configured to emit green signal light and receive blue signal light. That is, the underwater optical communication system disclosed in Patent Document described above is configured to perform bidirectional optical wireless communication using signal light mutually different in color between the first optical wireless communication device and the second optical wireless communication device.

The first optical wireless communication device disclosed in WO2021/002093 is configured to emit blue light and receive green light. The second optical wireless communication device disclosed in WO2021/002093 is configured to emit green light and receive blue light.

Here, when performing bidirectional wireless communication in water using blue light and green light, in the green light received by the first optical wireless communication device (first underwater optical wireless communication device), green light other the light emitted by the second optical wireless communication device (second underwater optical wireless communication device) sometimes interfere. In this case, the inventors of the present application have intensively studied and found the fact that green light other than the second light is generated due to the emission of the blue light (first light) emitted by the first optical wireless communication device, and this has an effect of reducing the communication accuracy as noise. Note that the noise caused by such green light is referred to as green light noise.

SUMMARY OF THE INVENTION

The present invention has been made to solve the above-described problems. It is an object of the present invention to provide an underwater optical wireless communication device and an underwater optical wireless communication system capable of suppressing a decrease in communication accuracy due to green light noise caused by green light other than second light, which is the green light received from a communication partner.

In order to attain the above-described object, an underwater optical wireless communication device for underwater optical wireless communication according to a first aspect of the present invention includes:

a light emitter configured to emit first light having a first wavelength included in a blue wavelength band as a center wavelength;

a light receiver configured to receive second light in which a second wavelength included in a green wavelength band is a center wavelength; and a noise suppression unit configured to suppress noise caused by green light generated due to the first light.

Further, in order to attain the above-described object, an underwater optical wireless communication system for underwater optical wireless communication according to a second aspect of the present invention, includes:

a first underwater optical wireless communication device configured to emit first light having a first wavelength included in a blue wavelength band as a center wavelength and emit second light in which a second wavelength included in a green wavelength band is a center wavelength, wherein first wavelength included in and of first emits center wavelength light of first light, and a second underwater optical wireless communication device configured to emit the second light and receives the first light, wherein the first underwater optical wireless communication device includes a light emitter configured to emit the first light, a light receiver configured to receive the second light, and a noise suppression unit configured to suppresses noise caused by green light generated due to the first light.

In the underwater optical wireless communication device according to the first aspect of the present invention, as described above, it is provided with a noise suppression unit for suppressing noise caused by green light generated due to the first light. As a result, the noise caused by the green light generated due to the first light is suppressed by the noise suppression unit, and therefore, it is possible to suppress a decrease in the S/N ratio (signal-to-noise ratio) of the second light due to the green light noise. Consequently, it is possible to suppress the decrease in the communication accuracy due to green light noise caused by green light other than the second light that is green light received from the communication partner.

Further, in the underwater optical wireless communication system according to the second aspect of the present invention, as described above, the first optical wireless communication device is provided with the noise suppression unit for suppressing noise caused by green light generated due to the first light. With this, it is possible to provide an underwater optical wireless communication system capable of suppressing the decrease in the communication accuracy due to green light noise caused by green light other than the second light that is green light received from the communication partner, as in the underwater optical wireless communication device according to the first aspect of the present invention.

BRIEF DESCRIPTION OF THE DRAWINGS

The preferred embodiments of the present invention are shown by way of example, and not limitation, in the accompanying drawings.

FIG. 10A is a schematic diagram for describing a light-receiving signal including a green light noise signal.

FIG. 10B is a schematic diagram for describing a compensation signal.

FIG. 10C is a schematic diagram for describing a light-receiving signal from which a green light noise signal has been removed.

DETAILED DESCRIPTION OF THE
PREFERRED EMBODIMENTS

In the following paragraphs, some preferred embodiments of the invention will be described by way of example and not limitation. It should be understood based on this disclosure that various other modifications can be made by those skilled in the art based on these illustrated embodiments.

Hereinafter, some embodiments in which the present invention is embodied will be described with reference to the attached drawings.

Figure 1:
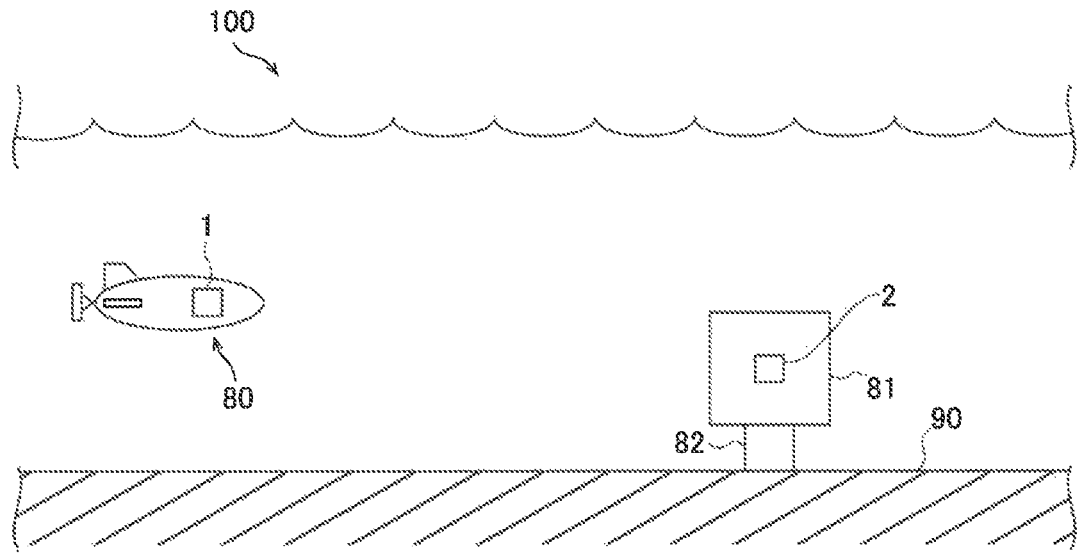
FIG. 1 is a schematic diagram showing an outline of an underwater optical wireless communication device and an underwater optical wireless communication system according to one embodiment of the present invention.
Figure 2:
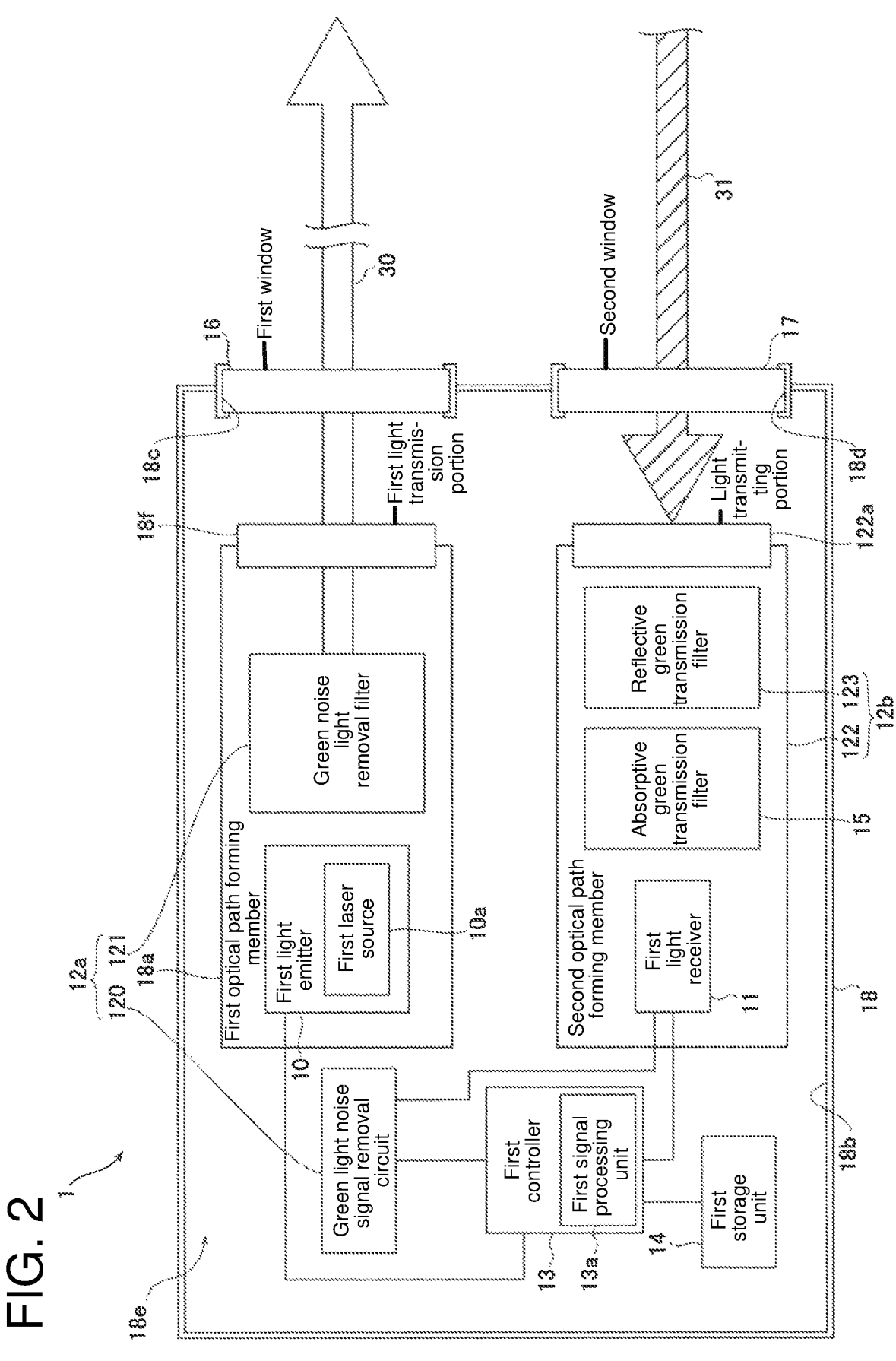
FIG. 2 is a block diagram showing an outline of the first optical wireless communication device.

With reference to FIG. 1 and FIG. 2, the configuration of a first communication device 1 and an underwater optical wireless communication system 100 according to one embodiment of the present invention will be described. Note that the first communication device 1 is one example of the "underwater optical wireless communication device" and the "first underwater optical wireless communication device" recited in claims.

As shown in FIG. 1, the underwater optical wireless communication system 100 is an underwater optical wireless communication system that performs optical wireless communication in water. The underwater optical wireless communication system 100 is provided with a first communication device 1 and a second communication device 2. Each of the first communication device 1 and the second communication device 2 is an optical wireless communication device that performs optical wireless communication in water. The first communication device 1 and the second communication device 2 are configured to enable bidirectional optical communication at the same time. In other words, the first communication device 1 and the second communication device 2 are configured to be capable of performing full-duplex communication using light (communication light) in water.

Note that signal light denotes light for transmitting information by changing the intensity of a light source at a predetermined timing. Further note that the second communication device 2 is one example of the "second underwater optical wireless communication device" recited in claims.

The first communication device 1 is arranged in water. Specifically, the first communication device 1 is provided in a moving body 80 that moves in water. The moving body 80 includes, for example, an AUV (Autonomous Underwater Vehicle).

The second communication device 2 is arranged in water. Specifically, the second communication device 2 is provided to a fixed body 81 fixed in water. The fixed body 81 is fixed in water by being installed on a seabed 90 with holding member 82.

(First Optical Wireless Communication Device)

Next, the configuration of the first communication device 1 will be described with reference to FIG. 2.

As shown in FIG. 2, the first communication device 1 includes a transmission unit (first light emitter 10), a receiving unit (first light receiver 11), a noise suppression unit, a first controller 13, a first storage unit 14, an absorptive green transmission filter 15, a first window 16, a second window 17, and a first housing 18. Note that the first light emitter 10 and the first light receiver 11 are examples of the "light emitter" and the "light receiver" recited in claims, respectively.

Figure 3:
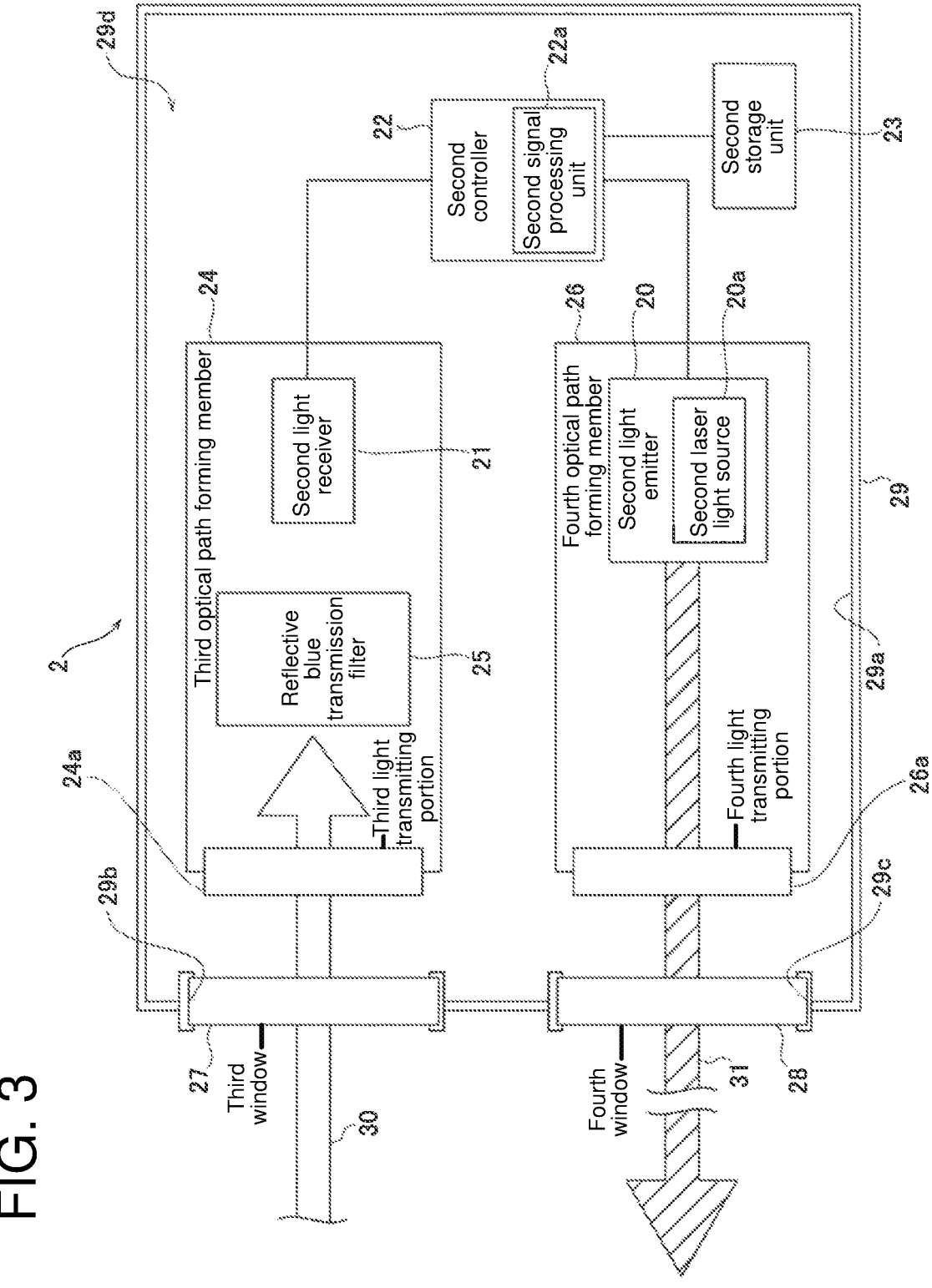
FIG. 3 is a block diagram showing an outline of the second optical wireless communication device.

The first communication device 1 is configured to emit a light signal (first light 30) from the transmission unit (first light emitter 10) via the first light transmitting portion 18f and the first window 16 to a communication partner (second communication device 2)(see FIG. 3). Further, the first communication device 1 is configured to receive signal light (second light 31) from the second communication device 2 by the receiving unit (first light receiver 11) via the second window 17 and the second light transmitting portion 122a to thereby receive an optical signal (information).

Further, the first controller 13 converts the data to be transmitted to the second communication device 2 into an electric signal and controls the emission of the first light 30 of the first light emitter 10. Further, the first controller 13 converts the light-receiving signal 33 (see FIG. 8) of the first light receiver 11 into data by controlling the operation of the first light receiver 11.

The first light emitter 10 is configured to emit the first light 30 of a first wavelength 40 (see FIG. 5) included in a blue wavelength band as a center wavelength. The first wavelength 40 is included, for example, in a wavelength band ranging from 440 nm to 455 nm. In this embodiment, the first wavelength 40 is, for example, 448 nm. Further, the first light 30 is light of a wavelength band including blue and green, not including red, with the first wavelength 40 being a center wavelength. The first light emitter 10 includes a first laser light source 10a that generates the first light 30. The first laser light source 10a is, for example, a semiconductor laser light source.

The first light receiver 11 is configured to receive second light 31 of a second wavelength 41 (see FIG. 4) included in a green wavelength band as a center wavelength. Specifically, the first light receiver 11 is configured to receive the second light 31 emitted from a second light emitter 20 (see FIG. 3) which will be described later. The first light receiver 11 includes, for example, a photomultiplier tube.

A noise suppression unit is configured to suppress noise caused by green light generated due to the first light 30. Specifically, the noise suppression unit includes at least one of a green light noise removal unit 12a for removing green light noise, which is noise caused by the green light generated due to the first light 30, and a green light noise generation suppression unit 12b for suppressing the generation of green light noise. In this embodiment, the noise suppression unit includes both the green light noise removal unit 12a and the green light noise generation suppression unit 12b.

The green light noise includes at least one of the green noise light 50a (see FIG. 6A) that is green light generated due to the first light 30 and a green light noise signal 50b (see FIG. 7) in which the green noise light 50a is converted to an electric signal by the first light receiver 11. In this embodiment, the green light noise includes both the green noise light 50a and the green light noise signal 50b. The details of the green noise light 50a will be described later.

The green light noise removal unit 12a includes at least one of a green light noise signal removal circuit 120 and a green noise light removal filter 121. In this embodiment, the green light noise removal unit 12a includes both the green light noise signal removal circuit 120 and the green noise light removal filter 121.

Figure 7:
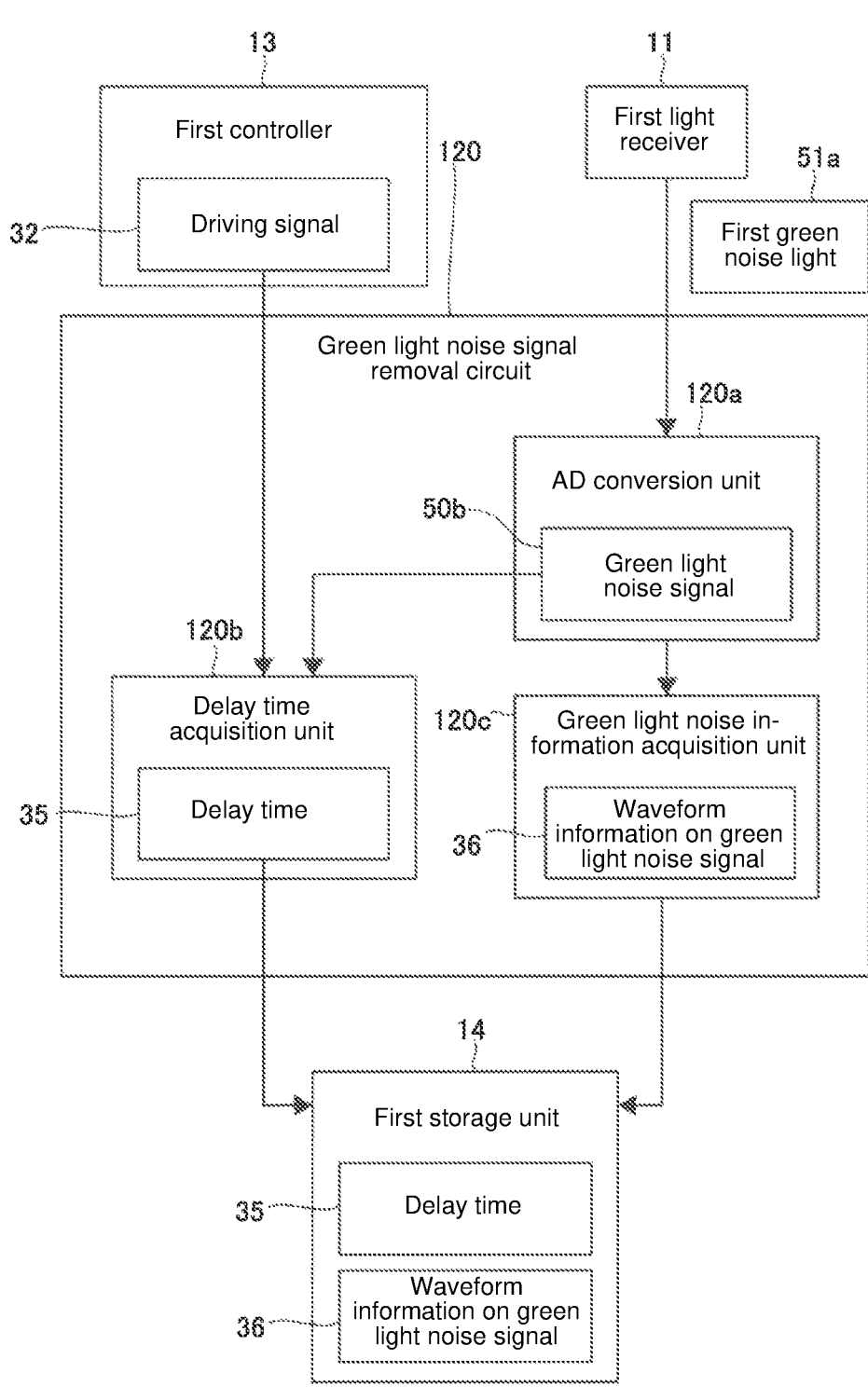
FIG. 7 is a block diagram for describing a configuration in which a green light noise signal removal circuit acquires a delay time until a green light noise signal is acquired and a compensation signal.

The green light noise signal removal circuit 120 is a circuit for electrically removing the green light noise signal 50b (see FIG. 7). The detailed configuration in which the green light noise signal removal circuit 120 removes the green light noise signal 50b will be described later. Note that, in the present specification, the term "electrically removing" means removing the signal to the extent that the signal does not become noise. That is, "electrically removing" is not limited to completely (100%) removing the signal.

Figure 6A:
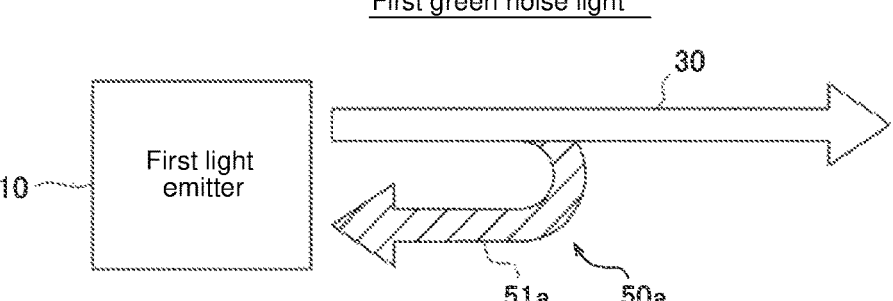
FIG. 6A is a schematic diagram for describing first green noise light that may be incident on a first light receiver and the generation cause of the first green noise light.

The green noise light removal filter 121 optically removes the green noise light 50a (see FIG. 6A). The details of the green noise light removal filter 121 will be described later.

The green light noise generation suppression unit 12b includes at least one of a third green light noise generation suppression unit (second optical path forming member 122) and a fourth green light noise generation suppression member (reflective green transmission filter 123). In this embodiment, the green light noise generation suppression unit 12b includes both the third green light noise generation suppression unit (second optical path forming member 122) and the fourth green light noise generation suppression member (reflective green transmission filter 123). The third green light noise generation suppression unit (second optical path forming member 122) and the fourth green light noise generation suppression member (reflective green transmission filter 123) will be detailed later.

The first controller 13 is a computer, a processor, or a circuitry configured to include a CPU (Central Processing Unit), a ROM (Read Only Memory), and a RAM (Random Access Memory). The first controller 13 functions as a controller that controls each unit of the first communication device 1 by executing a predetermined control program stored in the first storage unit 14. The first controller 13 as hardware includes a first signal processing unit 13a as a functional block of software (programming). The first controller 13 functions as the first signal processing unit 13a by executing a program stored in the first storage unit 14.

The first signal processing unit 13a is configured to convert the second light 31 emitted from the second communication device 2 (see FIG. 1) and received by the first light receiver 11 into data.

The first storage unit 14 is configured to store various programs to be executed by the first controller 13. The first storage unit 14 is configured to store a delay time 35 (see FIG. 7) which will be described later. The first storage unit 14 is a non-volatile storage device, such as, e.g., an HDD (Hard Disk Drive) and an SSD (Solid State Drive).

The absorptive green transmission filter 15 is configured to selectively transmit the light including the light of a wavelength band of the second light 31 and not including the light having a predetermined wavelength band of the first light 30. Further, the absorptive green transmission filter 15 is arranged at the pre-stage of the first light receiver 11. Specifically, the absorptive green transmission filter 15 is arranged at a position between the first light receiver 11 and the reflective green transmission filter 123. The details of the wavelength band that transmits through the absorptive green transmission filter 15 will be described later.

The first communication device 1 is configured to emit the first light 30 through the first window 16. Further, the first communication device 1 is configured to receive the second light 31 through the second window 17. The first window 16 and the second window 17 are formed of, for example, a glass plate or an acrylic plate.

The first housing 18 includes a first optical path forming member 18a, a first peripheral wall 18b, a first window 16, a first opening portion 18c closed by the first window 16, and a second opening portion 18d closed by the second window 17. The first peripheral wall 18b, the first window 16 for closing the first opening portion 18c, and the second window 17 for closing the second opening portion 18d constitute a closed first interior space 18e sealed in a water-tight manner.

As shown in FIG. 2, the first light emitter 10 and the green noise light removal filter 121 are held by the first optical path forming member 18a in the first housing 18.

The first optical path forming member 18a holds the first light emitter 10 and forms a first optical path which is an optical path of the first light 30. In this embodiment, the first optical path forming member 18a is configured to hold the green noise light removal filter 121 together with the first light emitter 10. The first optical path forming member 18a has a cylindrical configuration. Further, the first optical path forming member 18a is made of a metal material. The metal material is, for example, aluminum material. That is, the first optical path forming member 18a does not transmit light.

Further, the first light transmitting portion 18f is provided on a face of the first optical path forming member 18a facing the first window 16. The first light transmitting portion 18f is formed of, for example, a glass plate or an acrylic material. Therefore, the first light 30 emitted from the first light emitter 10 is emitted to the outside of the first communication device 1 via the first light transmitting portion 18f and the first window 16.

As shown in FIG. 2, the green noise light removal filter 121 is arranged at the post-stage of the first light emitter 10 in the first optical path forming member 18a. Specifically, the green noise light removal filter 121 is arranged at a position between the first light emitter 10 and the first window 16.

Further, as shown in FIG. 2, the first light receiver 11, the absorptive green transmission filter 15, and the reflective green transmission filter 123 are held by the second optical path forming member 122 in the first housing 18. The second optical path forming member 122 holds the first light receiver 11 and forms a second optical path that is an optical path for the second light 31. In this embodiment, the second optical path forming member 122 holds the absorptive green transmission filter 15 and the reflective green transmission filter 123 together with the first light receiver 11. The second optical path forming member 122 has a cylindrical configuration.

Further, the second light transmitting portion 122a is provided on a face of the second optical path forming member 122 facing the second window 17. The second light transmitting portion 122a is formed of, for example, a glass plate or an acrylic material. Therefore, the second light 31 incident on the first communication device 1 via the second window 17 is incident on the first light receiver 11 via the second light transmitting portion 122a.

As shown in FIG. 2, the absorptive green transmission filter 15 is arranged at the pre-stage of the first light receiver 11 in the second optical path forming member 122. Specifically, the absorptive green transmission filter 15 is arranged at a position between the first light receiver 11 and the reflective green transmission filter 123. Further, the fourth green light noise generation suppression member (reflective green transmission filter 123) is arranged at the pre-stage of the absorptive green transmission filter 15 in the second optical path forming member 122. Specifically, the reflective green transmission filter 123 is arranged at a position between the absorptive green transmission filter 15 and the second window 17.

(Second Optical Wireless Communication Device)

Next, the configuration of the second communication device 2 will be described with reference to FIG. 3.

As shown in FIG. 3, the second communication device 2 includes a second light emitter 20, a second light receiver 21, a second controller 22, a second storage unit 23, a third optical path forming member 24, a reflective blue transmission filter 25, a fourth optical path forming member 26, a third window 27, a fourth window 28, and a second housing 29.

The second communication device 2 is configured to emit signal light (second light 31) from the transmission unit (second light emitter 20) via the fourth light transmitting portion 26a and the fourth window 28 to transmit a light signal to a communication partner (first communication device 1) (see FIG. 1). Further, the second communication device 2 receives the signal light (first light 30) from the first communication device 1 by the receiving unit (second light receiver 21) via the third window 27 and the third light transmitting portion 24a and receives an optical signal (data). Further, the second controller 22 converts the data to be transmitted to the first communication device 1 into an electric signal and controls the emission of the second light 31 of the second light emitter 20. Further, the second controller 22 also converts the light-receiving signal of the second light receiver 21 into data by controlling the operation of the second light receiver 21.

The second light emitter 20 is configured to emit the second light 31 as signal light. The second light 31 is light of a second wavelength 41 (see FIG. 4) in a green wavelength band as a center wavelength. The second wavelength 41 is included in a wavelength band ranging from, for example, 532 nm to 518 nm. In this embodiment, the second wavelength 41 is, for example, 525 nm. Further, the second light 31 is light of a wavelength band having the second wavelength 41 as a center wavelength and not including red but including green. The second light emitter 20 includes a second laser light source 20a that generates the second light 31. The second laser light source 20a is, for example, a semiconductor laser light source.

The second light receiver 21 is configured to receive the first light 30 emitted from the first light emitter 10 (see FIG. 2). The second light receiver 21 includes, for example, a photomultiplier tube.

The second controller 22 is a computer, a processor, or a circuitry configured to include a CPU, a ROM, a RAM, and the like. The second controller 22 functions as a controller that controls each unit of the second communication device 2 by executing a predetermined control program stored in the second storage unit 23. The second controller 22 as hardware includes a second signal processing unit 22a as a functional block of software (program). The second controller 22 functions as the second signal processing unit 22a by executing a program stored in the second storage unit 23.

The second signal processing unit 22a is configured to change the first light 30 emitted from the first communication device 1 (see FIG. 2) and received by the second light receiver 21 into data.

The second storage unit 23 is configured to store various programs to be executed by the second controller 22. The second storage unit 23 is, for example, a non-volatile storage device, such as, e.g., an HDD or an SSD.

The third optical path forming member 24 is configured to hold the second light receiver 21 and the reflective blue transmission filter 25 in the second housing 29. The third optical path forming member 24 has a cylindrical configuration. The third optical path forming member 24 is made of a metal material. The metal material is, for example, aluminum material. Therefore, the third optical path forming member 24 is configured not to transmit light.

The reflective blue transmission filter 25 is configured to selectively transmit the first light 30 among the light incident on the second light receiver 21. Further, as shown in FIG. 3, the reflective blue transmission filter 25 is arranged at a pre-stage of the second light receiver 21. Specifically, the reflective blue transmission filter 25 is arranged between the second light receiver 21 and the third window 27. The detailed configuration of the reflective blue transmission filter 25 will be described later.

The fourth optical path forming member 26 is configured to hold the second light emitter 20 in the second housing 29. The fourth optical path forming member 26 has a cylindrical configuration. Further, the fourth optical path forming member 26 is made of a metal material. Accordingly, the fourth optical path forming member 26 is configured not to transmit light.

The second communication device 2 is configured to receive the first light 30 via the third window 27. Further, the second communication device 2 is configured to emit the second light 31 through the fourth window 28. The third window 27 and the fourth window 28 are each formed by, for example, a glass plate or an acrylic plate.

Further, the third light transmitting portion 24a is provided on a face of the third optical path forming member 24 facing the third window 27. The third light transmitting portion 24a is formed of, for example, a glass plate or an acrylic material. Therefore, the first light 30 incident on the second communication device 2 via the third window 27 is incident on the second light receiver 21 via the third light transmitting portion 24a.

Further, the fourth optical path forming member 26 is provided with the fourth light transmitting portion 26a on a face facing the fourth window 28. The fourth light transmitting portion 26a is formed of, for example, a glass plate or an acrylic material. Therefore, the second light 31 emitted from the second light emitter 20 is emitted to the outside of the second communication device 2 via the fourth light transmitting portion 26a and the fourth window 28.

The second housing 29 has a second peripheral wall 29a, a third opening portion 29b closed by the third window 27, and a fourth opening portion 29c closed by the fourth window 28. The second peripheral wall 29a, the third window 27 closing the third opening portion 29b, and the fourth window 28 closing the fourth opening portion 29c constitute a closed second interior space 29d sealed in a water-tight manner.

In this embodiment, the underwater optical wireless communication system 100 (see FIG. 1) is configured to communicate between the first communication device 1 and the second communication device 2 by receiving the first light 30 emitted from the first communication device 1 (see FIG. 1) by the second communication device 2 and communicate between the second communication device 2 and the first communication device 1 by receiving the second light 31 emitted from the second communication device 2 by the first communication device 1.

In this embodiment, the moving body 80 (see FIG. 1) travels in the sea to inspect, for example, a structure laid on the seabed 90. The first communication device 1 is configured to transmit the inspection result acquired by a detector (not shown) provided in the moving body 80 to the second communication device 2 by the first light 30. Further, the second communication device 2 is configured to receive the inspection result transmitted from the first communication device 1 and transmit the received inspection result to a communication device provided on land or on a mother ship or the like. In a case where communication is performed between the first communication device 1 and the second communication device 2, the moving body 80 is moved to a communicable region to perform communication.

The first light 30 and the second light 31 are different in color from each other. Accordingly, the first communication device 1 and the second communication device 2 are configured such that multiple optical communication for performing bidirectional communication can be performed by simultaneously emitting the first light 30 and the second light 31.

(Absorptive Green Transmission Filter and Reflective Blue Transmission Filter)

The absorptive green transmission filter 15 (see FIG. 2) and the reflective blue transmission filter 25 (see FIG. 3) will now be described with reference to FIG. 4 and FIG. 5.

Figure 4:
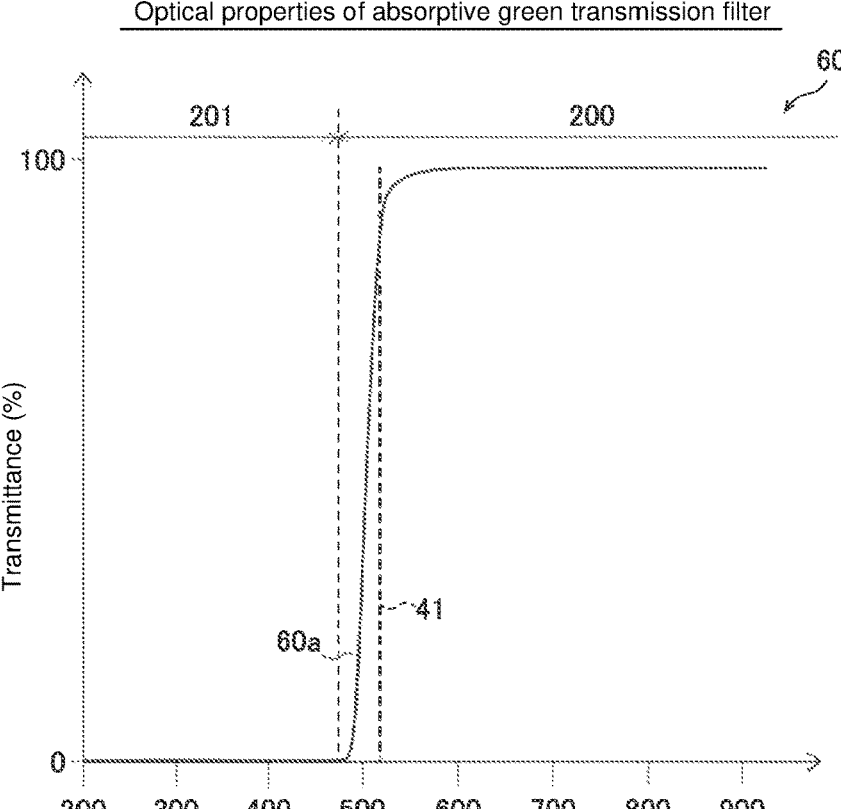
FIG. 4 is a schematic diagram for describing a wavelength band of light that transmits through an absorptive green transmission filter.

FIG. 4 is a graph 60 showing a predetermined wavelength band allowed to be passed by the absorptive green transmission filter 15 (see FIG. 2). In the graph 60, the vertical axis represents the transmittance, and the horizontal axis represents the wavelength.

The transmittance change curve 60a shown in FIG. 4 is a curve representing the relation between the wavelength of light and the transmittance in the absorptive green transmission filter 15 (see FIG. 2). As shown in the transmittance change curve 60a, in this embodiment, the absorptive green transmission filter 15 is configured to absorb light having a wavelength shorter than that of the second wavelength 41. That is, the absorptive green transmission filter 15 is a so-called absorptive long-pass filter that selectively transmits light including the light having a wavelength of the second light 31 (see FIG. 2) and not including the light of a predetermined wavelength band of the first light 30 (See FIG. 2). Note that the absorptive long-pass filter is a filter that absorbs light other than light having a predetermined wavelength region and converts the absorbed light into heat.

The absorptive green transmission filter 15 (see FIG. 2) has a first transmission band 200 including a first wavelength 41 and a first lower blocking region 201 that is shorter in wavelength than the first transmission band 200. In this embodiment, since the second light 31 is green light, the first transmission band 200 is set in the range capable of transmitting the light of the green wavelength band. Further, the second light 31 emitted from the second light emitter 20 is slightly shifted in wavelength due to the product error. Therefore, the lower limit of the first transmission band 200 is set on a shorter wavelength side than 500 nm by a predetermined wavelength.

Since the first communication device 1 (see FIG. 2) has the absorptive green transmission filter 15, the second light 31 (see FIG. 2) incident through the second window 17 (see FIG. 2) can be selectively transmitted and made incident on the first light receiver 11 (see FIG. 2).

Figure 5:
FIG. 5 is a schematic diagram for describing a wavelength band of light that transmits through a reflective blue transmission filter.
Figure 5:
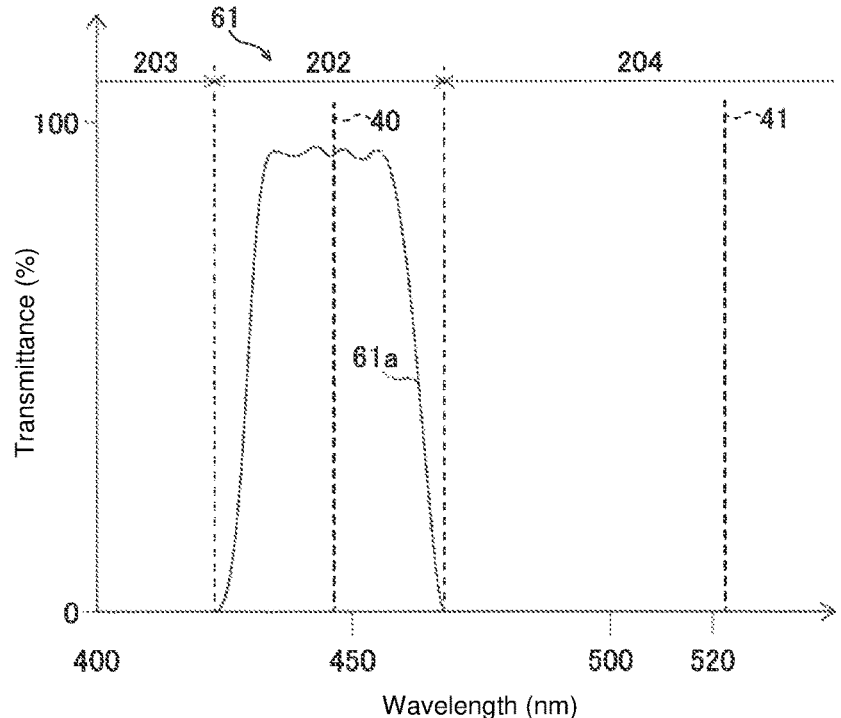

FIG. 5 is a graph 61 showing the wavelength band through which the reflective blue transmission filter 25 (see FIG. 3) allows to transmit. In the graph 61, the vertical axis represents the transmittance, and the horizontal axis represents the wavelength.

The transmittance change curve 61a shown in FIG. 5 is a curve showing the relation between the wavelength of light and the transmittance in the reflective blue transmission filter 25 (see FIG. 3). As shown in the transmittance change curve 61*a*, in this embodiment, the reflective blue transmission filter 25 is configured to selectively transmit the light of a predetermined wavelength band including the first wavelength 40 and not include the second wavelength 41.

The reflective blue transmission filter 25 is, for example, a so-called reflective band-pass filter that selectively transmits the light of the wavelength band including the first wavelength 40 by reflecting the light of a wavelength other than the wavelength band. The reflective bandpass filter is a filter that reflects light of a wavelength in a wavelength band other than a predetermined wavelength band and transmits the light of a wavelength in a predetermined wavelength band without reflecting, thereby selectively transmitting the light of a wavelength in a predetermined wavelength band.

The reflective blue transmission filter 25 (see FIG. 3) includes a second transmission band 202 having a first wavelength 40 as a center wavelength, a second lower blocking region 203 on a shorter wavelength side than the second transmission band 202, and a second upper blocking region 204 on a longer wavelength side than the second transmission band 202. In this embodiment, since the first light 30 is blue light, the second transmission band 202 is configured within a range capable of transmitting the light of a blue wavelength band.

Further, the first light 30 emitted from the first light emitter 10 (see FIG. 2) is slightly shifted in wavelength due to the product error. Therefore, the lower limit of the second transmission band 202 is set to a wavelength on a shorter wavelength side than 440 nm by a predetermined wavelength. Further, the upper limit of the second transmission band 202 is set to a wavelength on a longer wavelength side than 450 nm by a predetermined wavelength.

Since the second communication device 2 (see FIG. 3) has a reflective blue transmission filter 25 (see FIG. 3), it is possible to selectively transmit the first light 30 (see FIG. 3) incident through the third window 27 (see FIG. 3) to make the first light 30 to be incident on the the second light receiver 21 (see FIG. 3).

(Green Noise Light)

Here, the inventors of the present invention have intensively studied and found the fact that the green light received by the first communication device 1 (see FIG. 2) includes green light (green noise light 50*a*) other than the second light 31 (see FIG. 3) which is green light emitted by the second communication device 2 (see FIG. 3).

Specifically, as shown in FIG. 6A to FIG. 6D, the inventors of the present invention have found the fact that green noise light 50*a* is included as green light other than the second light 31 (see FIG. 3). The green noise light 50*a* includes, for example, first green noise light 51*a* to fourth green noise light 51*d*.

As shown in FIG. 6A, the first green noise light 51*a* is a green Raman scattered light caused by the Raman scatter of the first light 30 (see FIG. 2) in water. Like the first light 30, when blue light is emitted in water, green light (first green noise light 51*a*) in which the wavelength band is shifted toward a long wavelength side is generated by Raman scatter. When the first green noise light 51*a* occurs, the first green noise light 51*a* transmits through the absorptive green transmission filter 15 (see FIG. 2). Therefore, the first green noise light 51*a* reduces the S/N ratio of the second light 31 (see FIG. 2).

Figure 6B:
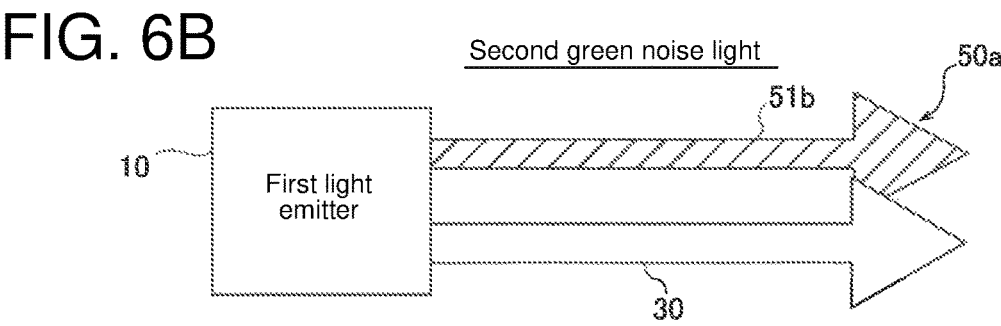
FIG. 6B is a schematic diagram for describing second green noise light that may be incident on a first light receiver and the generation cause of the second green noise light.

As shown in FIG. 6B, the light emitted from the first light emitter 10 includes the first light 30 which is blue light and green light. That is, the second green noise light 51*b* is green light emitted from the first light emitter 10 together with the first light 30 (see FIG. 2). After the second green noise light 51*b* is emitted from the first light emitter 10 (see FIG. 2) together with the first light 30, it may be reflected or scattered in the first communication device 1 (see FIG. 2) or in water or the like, thereby entering the first light receiver 11 (see FIG. 2). In this case, the second green noise light 51*b* reduces the S/N ratio of the second light 31 (see FIG. 2).

Figure 6C:
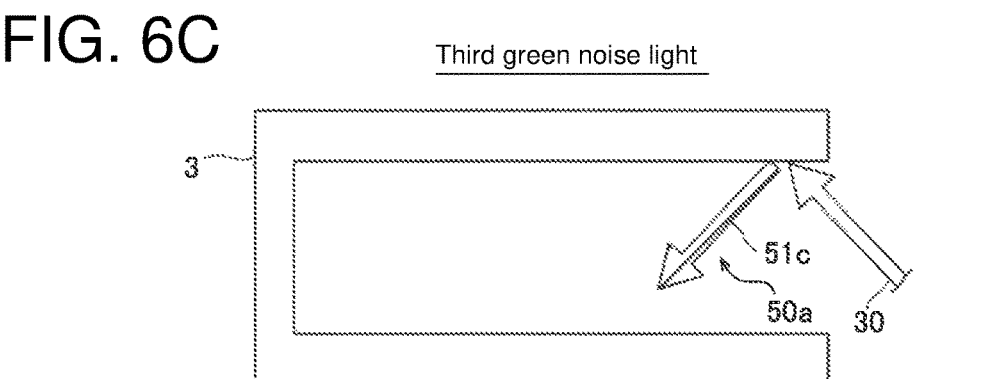
FIG. 6C is a schematic diagram for describing third green noise light that may be incident on the first light receiver and the generation cause of the third green noise light.

As shown in FIG. 6C, in a case where the optical path forming member or the like is formed of a resin member 3, when the first light 30 which is blue light is emitted to the resin member 3, green fluorescence is generated. That is, the third green noise light 51*c* is green fluorescence emitted from the resin member 3 when the resin member 3 is irradiated with the first light 30 (see FIG. 2). When the third green noise light 51*c* is incident on the first light receiver 11 (see FIG. 2), the third green noise light 51*c* reduces the S/N ratio of the second light 31 (see FIG. 2).

Figure 6D:
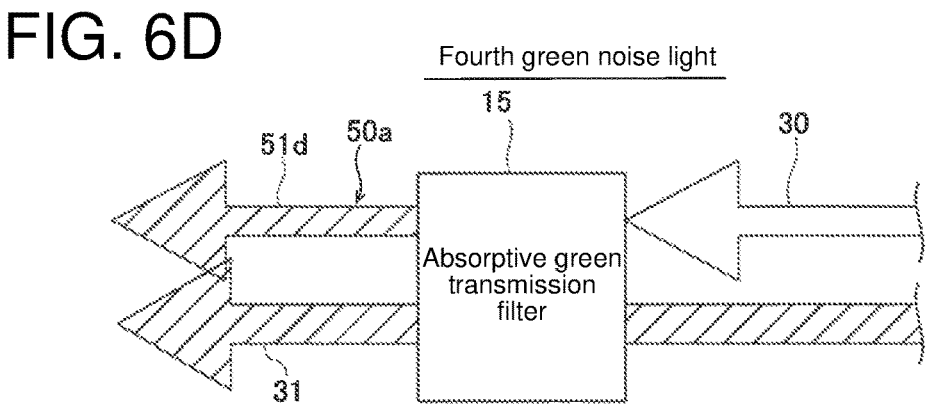
FIG. 6D is a schematic diagram for describing fourth green noise light that may be incident on a first light receiver and the generation cause of the fourth green noise light.

As shown in FIG. 6D, when the first light 30 which is blue light is emitted to the absorptive green transmission filter 15, green fluorescence is generated. That is, the fourth green noise light 51*d* is green fluorescence emitted from the absorptive green transmission filter 15 when the first light 30 is emitted to the absorptive green transmission filter 15. The first light receiver 11 (see FIG. 2) is provided at the post-stage of the absorptive green transmission filter 15. Therefore, the fourth green noise light 51*d* generated when the first light 30 is irradiated to the absorptive green transmission filter 15 enters the first light receiver 11. When the fourth green noise light 51*d* enters the first light receiver 11, the fourth green noise light 51*d* reduces the S/N ratio of the second light 31.

Therefore, in this embodiment, the deterioration of the communication accuracy of the second light 31 due to the first green noise light 51*a* to the fourth green noise light 51*d* by the green light noise signal removal circuit 120 (see FIG. 2) is suppressed by the green noise light removal filter 120 (see FIG. 2), the second optical path forming member 122 (see FIG. 2), and the reflective green transmission filter 123 (see FIG. 2).

(Removal of Green Light Noise Signal Due to First Green Noise Light)

With reference to FIG. 7 to FIG. 10, the configuration in which the green light noise signal removal circuit 120 (see FIG. 7) removes the green light noise signal 50*b* caused by the first green noise light 51*a* (see FIG. 7) will be described.

The first green noise light 51*a* (see FIG. 7) is green light caused by Raman scattering in water of the first light 30 (see FIG. 2) emitted by the first light emitter 10 (see FIG. 2). Since the green light noise signal removal circuit 120 can acquire the timing at which the first light emitter 10 emits the light from the first controller 13 (see FIG. 2), it is possible to acquire the timing at which the first green noise light 51*a* occurs.

Figure 8:
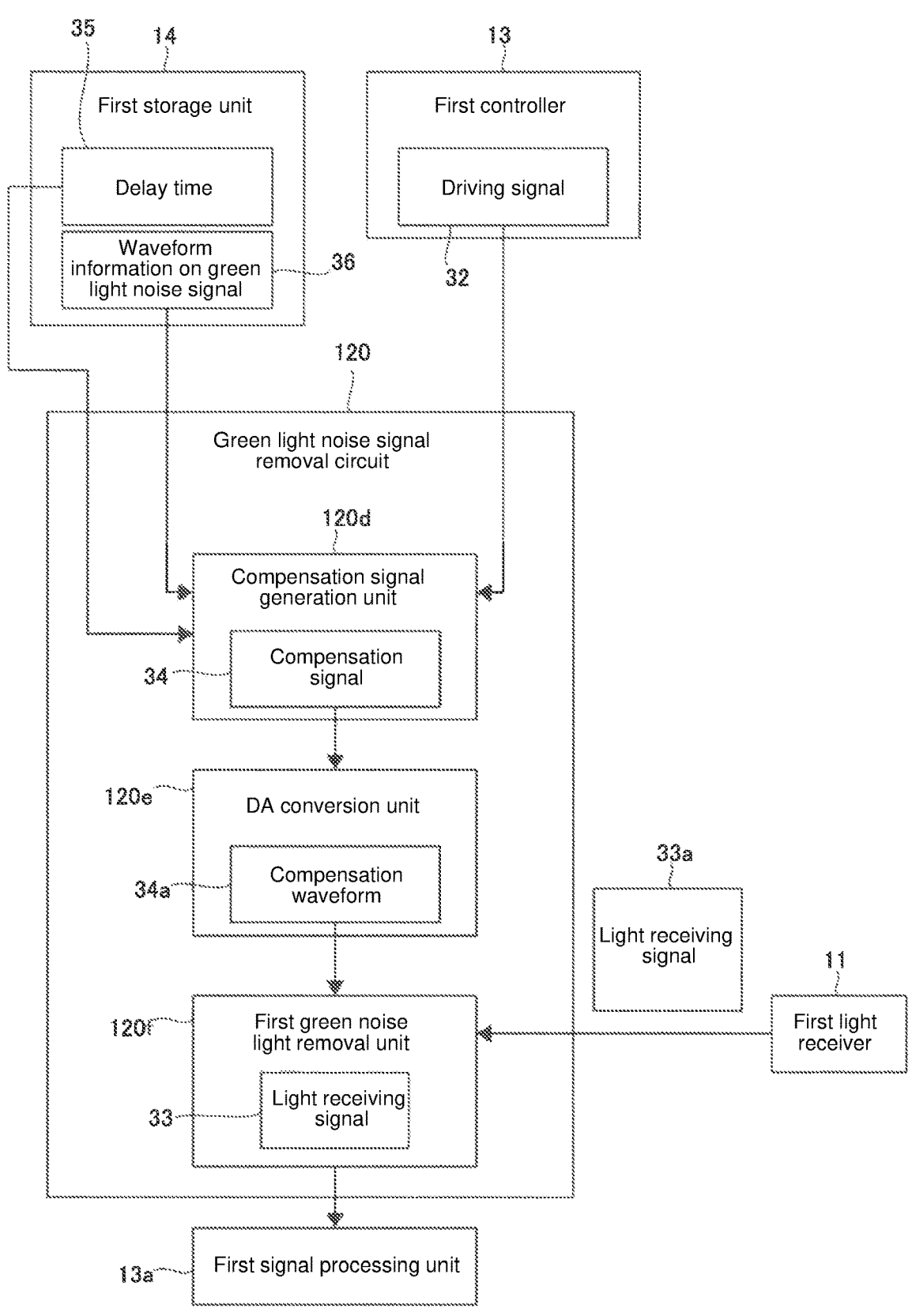
FIG. 8 is a block diagram for describing a configuration in which a green light noise signal removal circuit removes a green light noise signal.

Thus, in this embodiment, as shown in FIG. 7 and FIG. 8, the green light noise signal removal circuit 120 is configured to remove the green light noise signal 50*b* based on the first green noise light 51*a* (see FIG. 7) included in the light-receiving signal 33 (See FIG. 10) in the first light receiver 11 (see FIG. 2), based on the driving signal 32 when the first light emitter 10 (See FIG. 2) emits the first light 30 (see FIG. 2).

The processing of removing the green light noise signal 50*b* by the green light noise signal removal circuit 120 includes processing of acquiring the delay time 35 and the waveform information 36 on the green light noise signal at the time of calibration by the green light noise signal removal circuit 120, and processing of generating a compensation signal 34 (see FIG. 8) based on the waveform information 36 on the delay time 35 and the waveform information 36 on the green light noise signal when the first light 30 (see FIG. 2) is emitted during the receipt of the second light 31 and removing the green light noise signal 50b by the generated compensation signal 34.

(Acquisition of Compensation Signal and Delay Time)

First, with reference to FIG. 7, the configuration in which the green light noise signal removal circuit 120 acquires the delay time 35 and the waveform information 36 on the green light noise signal will be described.

The green light noise signal removal circuit 120 acquires a compensation signal 34 (see FIG. 8) at the time of calibration in a state in which the first light receiver 11 is not receiving the second light 31 (see FIG. 2). The compensation signal 34 is an electric signal of the light received by the first light receiver 11 when the first light emitter 10 (see FIG. 2) emits the first light 30 (see FIG. 2). Further, the green light noise signal removal circuit 120 acquires the delay time 35 from the time when the first light 30 is emitted to the time when the first green noise light 51a is detected during the calibration.

As shown in FIG. 7, the green light noise signal removal circuit 120 includes an AD conversion unit 120a, a delay time acquisition unit 120b, and a green light noise information acquisition unit 120c.

The AD conversion unit 120a is configured to convert the analog signal of the first green noise light 51a received by the first light receiver 11 into a green light noise signal 50b which is a digital signal. The AD conversion unit 120a includes, for example, an AD converting circuit. The AD conversion unit 120a outputs the converted green light noise signal 50b to the delay time acquisition unit 120b. Further, the AD conversion unit 120a outputs the converted green light noise signal 50b to the green light noise information acquisition unit 120c.

The delay time acquisition unit 120b and the green light noise information acquisition unit 120c are functional blocks that function when the green light noise signal removal circuit 120 executes programs stored in the first storage unit 14.

The delay time acquisition unit 120b is configured to acquire the delay time 35 based on the driving signal 32 and the green light noise signal 50b. Specifically, the delay time acquisition unit 120b acquires the driving signal 32 for driving the first light emitter 10 (see FIG. 2) from the first controller 13. The delay time acquisition unit 120b acquires the green light noise signal 50b from the AD conversion unit 120a. The delay time acquisition unit 120b acquires, as the delay time 35, the difference between the rise time t1 (see FIG. 9) of the driving signal 32 and the rise time t2 (see FIG. 9) of the green light noise signal 50b. Then, the delay time acquisition unit 120b outputs the acquired delay time 35 to the first storage unit 14.

Further, the green light noise information acquisition unit 120c acquires the waveform information 36 on the green light noise signal from the green light noise signal 50b acquired from the AD conversion unit 120a. The waveform information 36 on the green light noise signal includes, for example, the waveform and the amplitude of the green light noise signal 50b. The green light noise information acquisition unit 120c outputs the acquired waveform information 36 on the green light noise signal to the first storage unit 14.

The first storage unit 14 stores the delay time 35 input from the delay time acquisition unit 120b. Further, the first storage unit 14 stores the waveform information 36 on the green light noise signal input from the green light noise information acquisition unit 120c.

In this embodiment, the first communication device 1 (see FIG. 1) is provided in the moving body 80 (see FIG. 1) that travels in water and is movable in water. For this reason, the compensation signal 34 may vary in magnitude or the like depending on the environments of the moving body 80. Therefore, in this embodiment, the green light noise signal removal circuit 120 is configured to generate (update) the compensation signal 34 at predetermined time intervals.

(Removal of Green Light Noise Signal)

Next, the configuration in which the green light noise signal removal circuit 120 removes the green light noise signal 50b (see FIG. 7) will be described with reference to FIG. 8.

In this embodiment, the green light noise signal removal circuit 120 acquires the duration required for the compensation signal 34 to be input after the driving signal 32 is output. The green light noise signal removal circuit 120 is configured to remove the green light noise signal 50b by the delayed compensation signal 34 for the time required for the compensation signal 34 to be input. The time required for the compensation signal 34 to be input is the delay time 35 acquired at the time of calibration and stored in the first storage unit 14.

Specifically, as shown in FIG. 8, the green light noise signal removal circuit 120 is further provided with a compensation signal generation unit 120d, a DA conversion unit 120e, and a first green noise light removal unit 120f. The compensation signal generation unit 120d is a functional block that functions when the green light noise signal removal circuit 120 executes a program stored in the first storage unit 14. The DA conversion unit 120e is configured to convert the compensation signal 34, which is a digital signal, into an compensation waveform 34a, which is an analog signal. The DA conversion unit 120e includes, for example, a DA converting circuit. Further, the first green noise light removal unit 120f includes, for example, a differential amplifier.

When the first controller 13 outputs the driving signal 32, the driving signal 32 is input to the first light emitter 10 (see FIG. 2) and the compensation signal generation unit 120d. When the driving signal 32 is input, the compensation signal generation unit 120d acquires the delay time 35 and the waveform information 36 on the green light noise signal from the first storage unit 14. Then, the compensation signal generation unit 120d generates the compensation signal 34 based on the waveform information 36 on the green light noise signal. The compensation signal generation unit 120d delays the compensation signal 34 by the delay time 35 after the driving signal 32 is input and outputs the compensation signal 34 to the DA conversion unit 120e.

Note that the compensation signal generation unit 120d generates and outputs the compensation signal 34 only when the driving signal 32 is in an on state. When the driving signal 32 is in an off state, the compensation signal generation unit 120d does not generate and output the compensation signal 34.

The DA conversion unit 120e converts the compensation signal 34, which is a digital signal input from the compensation signal generation unit 120d, into a compensation waveform 34a, which is an analog signal. Then, the DA conversion unit 120e outputs the converted compensation waveform 34a to the first green noise light removal unit 120f.

To the first green noise light removal unit 120f, the light-receiving signal 33a is input from the first light receiver 11. The light-receiving signal 33*a* is an electric signal of the second light 31, including the first green noise light 51*a* (see FIG. 7). Further, the compensation waveform 34*a* is input from the DA conversion unit 120*e* to the first green noise light removal unit 120*f*. The first green noise light removal unit 120*f* acquires the second light 31 by removing the first green noise light 51*a* from the light-receiving signal 33*a*. Specifically, the first green noise light removal unit 120*f* acquires the light-receiving signal 33, which is an electric signal of the second light 31 from which the first green noise light 51*a* has been removed, by subtracting the compensation waveform 34*a* from the light-receiving signal 33*a*. The first green noise light removal unit 120*f* outputs the acquired light-receiving signal 33 to the first signal processing unit 13*a*.

Figure 9:
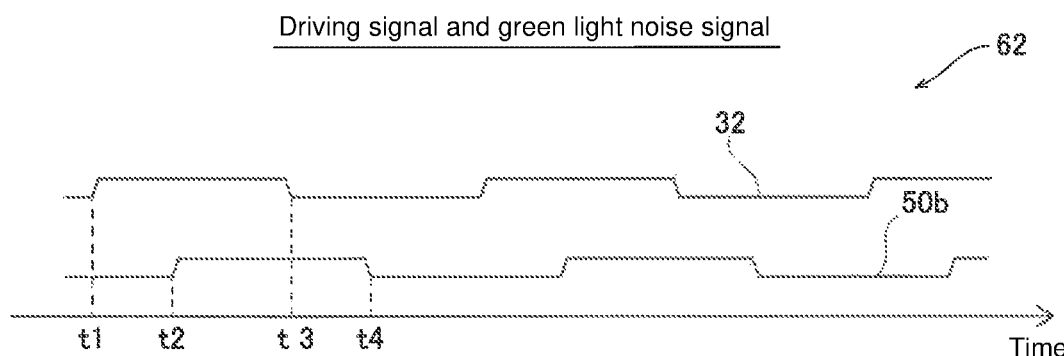
FIG. 9 is a schematic diagram for describing a delay time from when a driving signal is output until when a green light noise signal is input.

FIG. 9 is a graph 62 showing the waveforms of the driving signal 32 and the green light noise signal 50*b*. In the graph 62, the horizontal axis represents time.

As shown in the graph 62, there is a difference between the time t1 at which the driving signal 32 rises and the time t2 at which the green light noise signal 50*b* rises. The difference between the time t1 and the time t2 is a difference between the time at which the driving signal 32 rises, the first light 30 (see FIG. 2) emitted from the first light emitter 10 (see FIG. 2) is Raman-scattered into the first green noise light 51*a* (see FIG. 6 A) and received by the first light receiver 11 (see FIG. 2) and the time at which the first green noise light 51*a* is converted into an electric signal.

Note that since the first green noise light 51*a* occurs instantaneously after the first light 30 is emitted, the difference between the time t1 and the time t2 is mainly the time required for the first green noise light 51*a* is converted into an electric signal. The difference between the time t1 and the time t2 is the delay time 35 (see FIG. 7) as described above.

Further, as shown in the graph 62, there also occurs a difference between the time t3 at which the driving signal 32 falls and the time t4 at which the green light noise signal 50*b* falls. This difference is a time interval similar to the delay time 35. Thus, as shown in graph 62, in a case where the first communication device 1 (see FIG. 2) communicates by the first light 30, it repeats that the driving signal 32 rises and then the green light noise signal 50*b* rises after the delay time 35 has elapsed, and the driving signal 32 falls and then the green light noise signal 50*b* falls after the delay time 35 has elapsed.

FIG. 10A is a graph 63 showing the light-receiving signal 33*a* of the second light 31*a* (see FIG. 8) including the first green noise light 51*a* (see FIG. 7). FIG. 10B is a graph 64 of the compensation signal 34. FIG. 10C is a graph 65 showing the light-receiving signal 33 of the second light 31 (see FIG. 8) after removing the first green noise light 51*a*. Note that the vertical axis of each of the graphs 63 to 65 represents signal strength, and the horizontal axis represents time.

As shown in the graph 63, the light-receiving signal 33*a* of the second light 31*a* (see FIG. 8) including the first green noise light 51*a* (see FIG. 7) includes the signal component 31*b* of the second light 31 (see FIG. 8) and the green light noise signal 50*b*. Note that in the graph 63, for simplicity, the signal components 31*b* of the second light 31 and the green light noise signal 50*b* are hatched differently from each other.

By subtracting the compensation signal 34 shown in the graph 64 from the light-receiving signal 33*a* shown in the graph 63, the light-receiving signal 33 from which the green light noise signal 50*b* has been removed can be acquired as shown in the graph 65.

(Removal of Second Green Noise Light)

Figure 11:
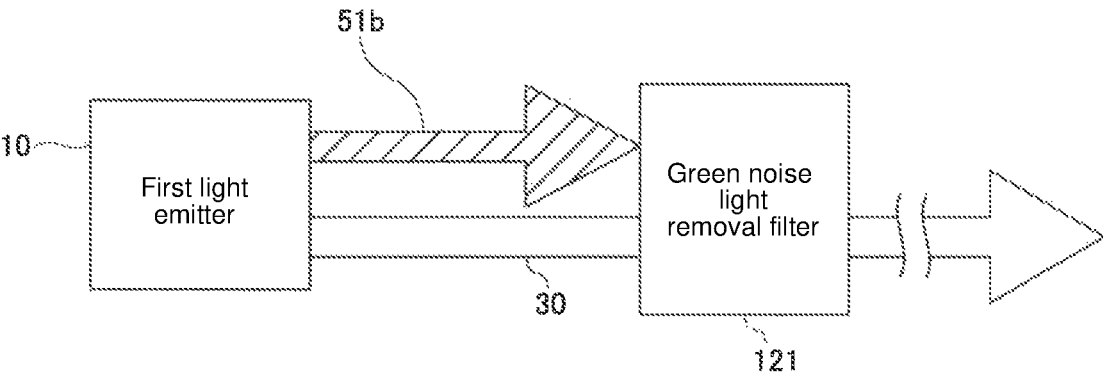
FIG. 11 is a schematic diagram for describing the configuration in which a green noise light removal filter removes second green noise light.

Next, with reference to FIG. 11, the configuration in which the green noise light removal filter 121 removes the second green noise light 51*b* will be described.

The green noise light removal filter 121 has optical properties similar to those of the reflective blue transmission filter 25 (see FIG. 3) and is configured to selectively transmit light of a blue wavelength band without transmitting light of a green wavelength band. That is, the green noise light removal filter 121 is configured to selectively transmit the first light 30 without transmitting the second green noise light 51*b*. Therefore, as shown in FIG. 11, only the first light 30, out of the first light 30 emitted from the first light emitter 10 and the second green noise light 51*b* which is green light included in the first light 30, is emitted to the outside of the first communication device 1 (see FIG. 2) through the first window 16 (see FIG. 2).

(Suppression of Generation of Third Green Noise Light)

Figure 12:
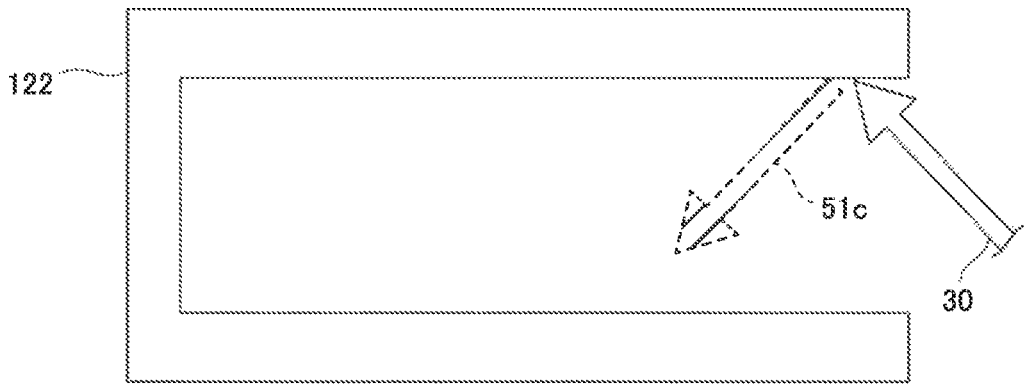
FIG. 12 is a schematic diagram for describing the configuration in which a second optical path forming member suppresses the generation of third green noise light.

Next, with reference to FIG. 12, the configuration in which the third green light noise generation suppression unit (second optical path forming member 122) suppresses the generation of the third green noise light 51*c* will be described. The third green light noise generation suppression unit (second optical path forming member 122) is configured to suppress the generation of the third green noise light 51*c* due to the first light 30 emitted to the second optical path forming member 122. Specifically, the second optical path forming member 122 is formed of a metal material. The metal material is, for example, aluminum material. Thus, the second optical path forming member 122 does not transmit light.

Here, a metal material, such as, e.g., an aluminum material, is less likely to generate green fluorescence even when irradiated with blue light. Therefore, as shown in FIG. 12, even when the second optical path forming member 122, which is a metal material, such as, e.g., aluminum material, is irradiated with the first light 30, which is blue light, generation of the third green noise light 51*c*, which is green fluorescence, is suppressed. Note that in FIG. 12, the third green noise light 51*c* is represented by a broken line in which the generation of third green noise light 51*c* is suppressed.

(Suppression of Generation of Fourth Green Noise Light)

Next, the configuration for suppressing the occurrence of the fourth green noise light 51*d* (see FIG. 6 D) will be described with reference to FIG. 13 and FIG. 14. The fourth green light noise generation suppression member is configured to suppress the generation of the fourth green noise light 51*d*. The fourth green light noise generation suppression member is the reflective green transmission filter 123 that suppresses the generation of the fourth green noise light 51*d*.

Figure 13:
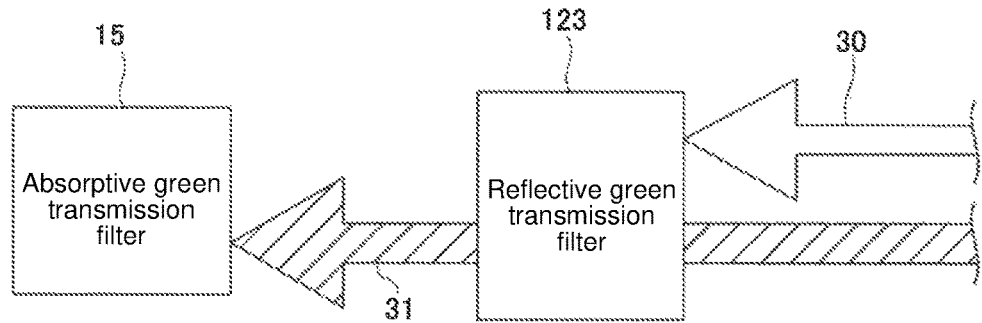
FIG. 13 is a schematic diagram for describing the configuration in which a reflective green transmission filter suppresses the generation of fourth green noise light.

As shown in FIG. 13, by providing the reflective green transmission filter 123 at the pre-stage of the absorptive green transmission filter 15, even if the first light 30 and the second light 31 is incident on the absorptive green transmission filter 15 via the second window 17 (see FIG. 2) and the second light transmitting portion 122*a* (see FIG. 2), the first light 30 is removed by the reflective green transmission filter 123. Therefore, it is possible to prevent the first light 30 from being emitted to the absorptive green transmission filter 15. Therefore, it is possible to suppress that the first light 30 is emitted to the absorptive green transmission filter 15 to generate the fourth green noise light 51*d* (see FIG. 6) from the absorptive green transmission filter 15. Note that FIG. 13 shows a configuration example in which one reflective green transmission filter 123 is provided at the pre-stage of the absorptive green transmission filter 15.

Figure 14:
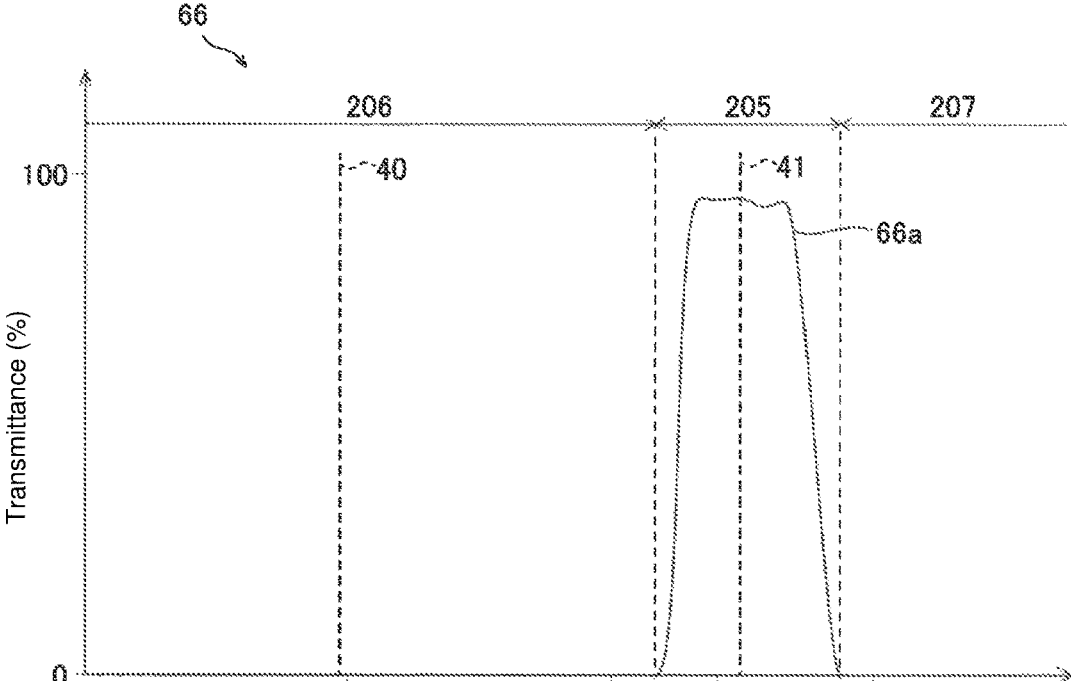
FIG. 14 is a schematic diagram for describing a wavelength band of light that transmits through a reflective green transmission filter.

FIG. 14 is a graph 66 showing a predetermined wavelength band through which the reflective green transmission filter 123 (see FIG. 13) allows to transmit. In the graph 66, the vertical axis is transmittance and the horizontal axis is wavelength.

The transmittance change curve 66*a* shown in FIG. 14 is a curve representing the relation between the wavelength of the light and the transmittance in the reflective green transmission filter 123. As shown in the transmittance change curve 66*a*, in this embodiment, the fourth green light noise generation suppression member (reflective green transmission filter 123 (see FIG. 13)) is configured to suppress the generation of the fourth green noise light 51*d* (see FIG. 6) due to the first light 30 (see FIG. 2) emitted to the absorptive green transmission filter 15 (see FIG. 2).

Specifically, the reflective green transmission filter 123 selectively transmits the light of a predetermined wavelength not including the wavelength band of the first light 30 by reflecting the light of the wavelength band of the first light 30. The reflective green transmission filter 123 is, for example, a so-called reflective band-pass filter that selectively transmits the light of a wavelength band including the second wavelength 41 by reflecting the light of a wavelength other than the wavelength band including the second wavelength. Accordingly, the first light 30, which is the light of a wavelength band including the first wavelength 40, is reflected by the reflective green transmission filter 123.

The reflective green transmission filter 123 includes a third transmission band 205 having a second wavelength 41 as a center wavelength, a third lower blocking area 206 on the shorter wavelength side than the third transmission band 205, and a third upper blocking area 207 on the longer wavelength side than the third transmission band 205.

In this embodiment, since the second light 31 is green light, the third transmission band 205 is configured within a range capable of transmitting a green wavelength band. Further, the second light 31 (see FIG. 13) emitted from the second light emitter 20 (see FIG. 3) is slightly shifted in wavelength due to the product error. Therefore, the lower limit of the third transmission band 205 is set to a wavelength on the shorter wavelength side than 518 nm by a predetermined wavelength. Further, the upper limit of the third transmission band 205 is set to a wavelength on the longer wave side than 532 nm by a predetermined wavelength.

(Reflective Green Transmission Filter Holding Member)

Figure 15A:
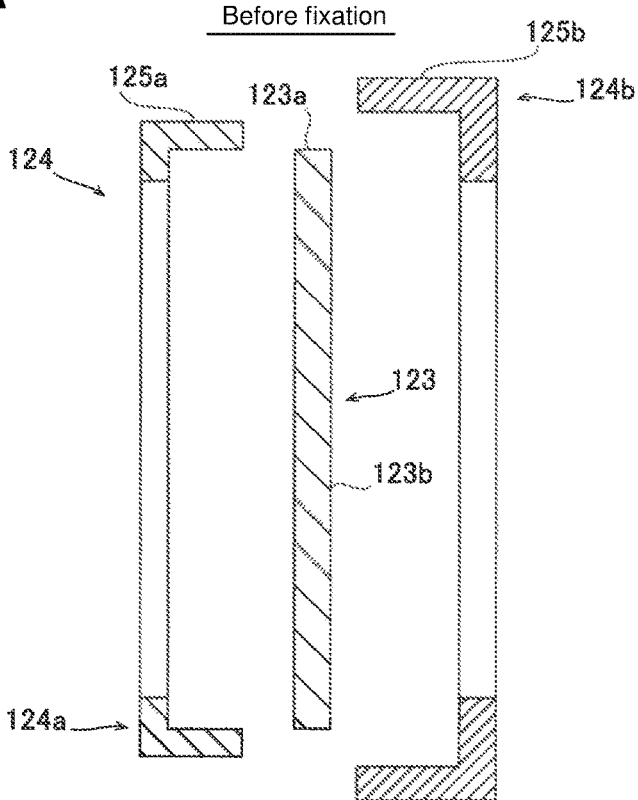
FIG. 15A is a schematic diagram for describing a structure of a reflective green transmission filter holding member before fixation.

As shown in FIG. 15A, in this embodiment, the first communication device 1 includes a pair of reflective green transmission filter holding members 124 for holding the reflective green transmission filter 123 by sandwiching the reflective green transmission filter 123. The pair of reflective green transmission filter holding members 124 includes one side holding member 124*a* and the other side holding member 124*b*.

Further, the pair of reflective green transmission filter holding members 124 each has a U-shape in cross-section. Specifically, the one side holding member 124*a* has a protrusion 125*a* protruding toward the other side holding member 124*b*. Therefore, the one side holding member 124*a* has a U-shape in cross-section when viewed from the side surface 123*b* of the reflective green transmission filter 123. Note that FIG. 15A and FIG. 15B are diagrams assuming that the first light 30 (see FIG. 2) is emitted from the other side holding member 124*b*.

The other side holding member 124*b* has a protrusion 125*b* protruding toward the one side holding member 124*a*. Therefore, the other side holding member 124*b* has a U-shape in cross-section when viewed from the side surface 123*b* of the reflective green transmission filter 123.

The pair of reflective green transmission filter holding members 124 is configured to be capable of forming a region 70 that overlap each other when viewed from the side surface 123*a* (see FIG. 15A) of the reflective green transmission filter 123.

Figure 15B:
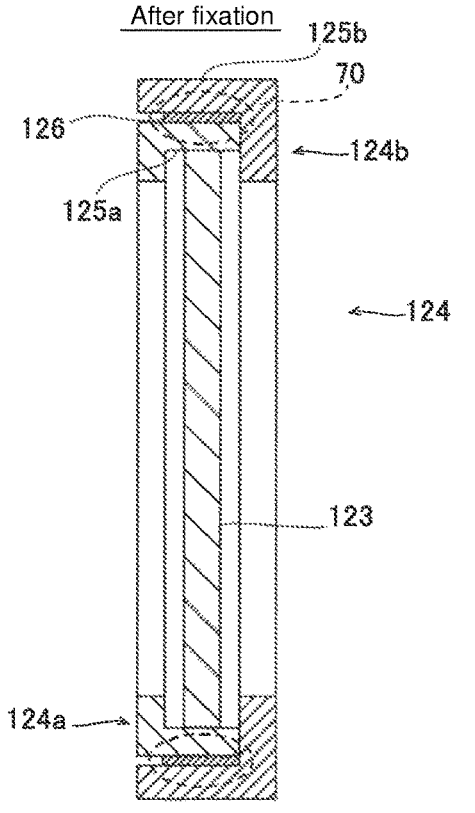
FIG. 15B is a schematic diagram for describing the structure of the reflective green transmission filter holding member after fixation.

Specifically, as shown in FIG. 15B, in the case of holding the reflective green transmission filter 123 by the pair of reflective green transmission filter holding members 124, in a state in which the reflective green transmission filter 123 is sandwiched by the one side holding member 124*a* and the other side holding member 124*b*, the one side holding member 124*a* and the other side holding member 124*b* are fixed. At this time, the protrusion 125*a* of the one side holding member 124*a* and the protrusion 125*b* of the other side holding member 124*b* overlap each other when viewed from the side surface 123*a* of the reflective green transmission filter 123 to form the region 70.

The region 70 is a region not irradiated with the first light 30 (see FIG. 2) by the one side holding member 124*a* and the other side holding member 124*b*. Therefore, for example, by applying an adhesive 126 to the region 70, even in a case where the one side holding member 124*a* and the other side holding member 124*b* are fixed, it is possible to prevent the adhesive 126 from being irradiated with the first light 30. Therefore, it is possible to suppress the generation of the green fluorescence due to the fact that the adhesive 126 is irradiated with the first light 30.

The region 70 is superimposed on each other when viewed from the side surface 123*a* (see FIG. 15A) of the reflective green transmission filter 123. Therefore, even if the first light 30 is multiple-scattered in the reflective green transmission filter holding member 124, the first light 30 only reaches the inner surface of the protrusion 125*a*. Therefore, in this embodiment, the reflective green transmission filter holding member 124 can suppress the adhesive 126 from being irradiated with the first light 30.

(Calibration Processing)

Figure 16:
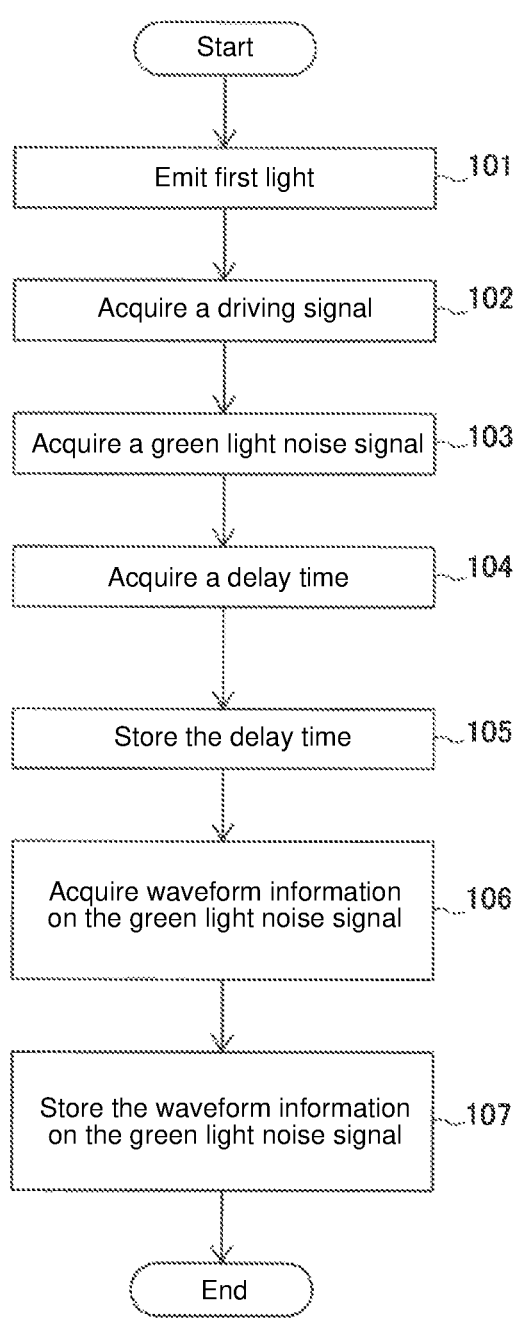
FIG. 16 is a flowchart for describing calibration processing by a green light noise signal removal circuit.

Next, with reference to FIG. 16, the processing that the green light noise signal removal circuit 120 (see FIG. 7) acquires the delay time 35 (see FIG. 7) will be described.

In Step 101, the first controller 13 (see FIG. 7) emits the first light 30 (see FIG. 2) by outputting the driving signal 32 (see FIG. 7) to the first light emitter 10 (see FIG. 2).

In Step 102, the delay time acquisition unit 120*b* (see FIG. 7) acquires the driving signal 32 from the first controller 13. Note that the driving signal 32 is output also to the delay time acquisition unit 120*b* when it is output from the first controller 13 to the first light emitter 10. Accordingly, the delay time acquisition unit 120*b* may acquire the timing at which the first light 30 is emitted from the first light emitter 10.

In Step 103, the delay time acquisition unit 120*b* acquires the green light noise signal 50*b*.

At Step 104, the delay time acquisition unit 120*b* acquires the delay time 35 (see FIG. 7). Specifically, the delay time acquisition unit 120*b* acquires the delay time 35 based on the driving signal 32 acquired in Step 102 and the green light noise signal 50*b* acquired in Step 103.

In Step 105, the first storage unit 14 stores the delay time 35.

In Step 106, the green light noise information acquisition unit 120*c* (see FIG. 7) acquires the waveform information 36 on the green light noise signal.

In Step 107, the first storage unit 14 stores the waveform information 36 on the green light noise signal. Thereafter, the processing ends.

Note that either the processing in Step 102 to Step 104 or the processing in Step 106 and Step 107 may be performed first. The processing in Step 102 to Step 104 and the processing in Step 106 and Step 107 may be executed in parallel.

(Green Light Noise Signal Removal Processing)

Figure 17:
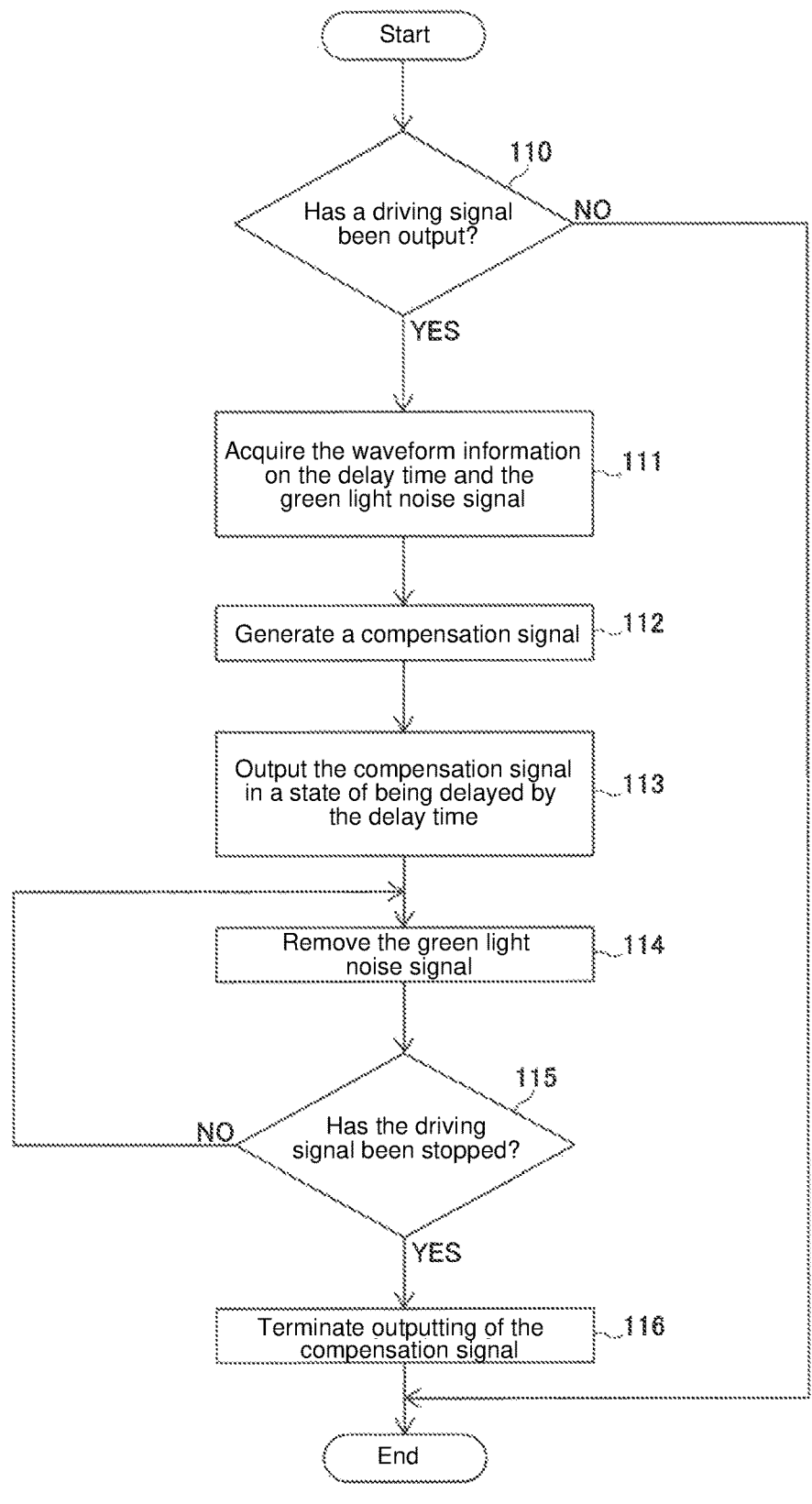
FIG. 17 is a flowchart for describing the processing of removing a green light noise signal by the green light noise signal removal circuit.

Next, with reference to FIG. 17, the processing in which the green light noise signal removal circuit 120 (see FIG. 8) removes the green light noise signal 50*b* (see FIG. 8) will be described. Note that the processing shown in FIG. 17 is initiated when the compensation signal generation unit 120*d* (see FIG. 8) acquires the first controller 13 (see FIG. 8) from the driving signal 32 (see FIG. 8).

In Step 110, the compensation signal generation unit 120*d* determines whether the driving signal 32 (see FIG. 8) has been output. When the driving signal 32 is output, the processing proceeds to Step 111. When the driving signal 32 has not been output, the processing ends.

In Step 111, the compensation signal generation unit 120*d* acquires the delay time 35 (see FIG. 8) and the waveform information 36 (see FIG. 8) on the green light noise signal from the first storage unit 14 (see FIG. 8).

In Step 112, compensation signal generation unit 120*d* generates a compensation signal 34 (see FIG. 8).

In Step 113, the compensation signal generation unit 120*d* acquires the driving signal 32 and then outputs the compensation signal 34 in a state in which it is delayed by the delay time 35.

In Step 114, the first green noise light removal unit 120*f* (see FIG. 8) acquires the light-receiving signal 33 (see FIG. 8) of the second light 31 by subtracting the compensation signal 34 from the light-receiving signal 33*a* (see FIG. 8) of the second light 31 (FIG. 3) including the first green noise light 51*a* (see FIG. 7). That is, the first green noise light removal unit 120*f* removes the green light noise signal 50*b* (see FIG. 7) from the second light 31*a* including the first green noise light 51*a*.

In Step 115, the compensation signal generation unit 120*d* determines whether the driving signal 32 has been stopped. When the driving signal 32 has not been stopped, the processing proceeds to Step 114. When the driving signal 32 is stopped, the process proceeds to Step 116.

In Step 116, the compensation signal generation unit 120*d* stops the output of the compensation signal 34. Note that when the driving signal 32 is stopped, the first light 30 (see FIG. 2) is stopped. However, even when the light emission of first light 30 is stopped, the first green noise light 51*a* received by the first light receiver 11 (see FIG. 2) is converted into the green light noise signal 50*b*. Therefore, even when the driving signal 32 is stopped, the green light noise signal 50*b* is acquired after the delay by 35 minutes of the delay time. Therefore, the green light noise signal removal circuit 120 continuously processes the removal of the green light noise signal 50*b* for 35 minutes of the delay time even after the driving signal 32 is stopped. Thereafter, the processing ends.

Effects of this Embodiment

In this embodiment, the following effects can be obtained.

In this embodiment, as described above, the underwater optical wireless communication device (first communication device 1) is an underwater optical wireless communication device for performing optical wireless communication in water. It is provided with the first light emitter 10 configured to emit the first light 30 of the first wavelength 40 included in the blue wavelength band as a center wavelength, the first light receiver 11 configured to receive the second light 31 of the second wavelength 41 included in the green wavelength band as the center wavelength, and a noise suppression unit configured to suppress the noise caused by the green light generated due to the first light 30.

With this, the noise suppression unit suppresses the noise caused by the green light generated due to the first light 30, and therefore, it is possible to prevent the S/N ratio of the second light 31 from decreasing. Consequently, it is possible to suppress the decrease in communication accuracy due to the green light noise caused by the green light other than the second light 31 which is the green light received from the communication partner (second communication device 2).

Further, in this embodiment, as described above, the underwater optical wireless communication system 100 is an underwater optical wireless communication system that performs optical wireless communication in water. It is provided with the first optical wireless communication device (first communication device 1) configured to emit the first light 30 of the first wavelength 40 included in the blue wavelength band as a center wavelength and receive the second light 31 of the second wavelength 41 included in the green wavelength band as a center wavelength and the second underwater optical communication device (second communication device 2) configured to emit the second light 31 and receive the first light 30. The first underwater optical wireless communication device (first communication device 1) includes the first light emitter 10 configured to emit the first light 30, the first light receiver 11 configured to receive the second light 31, and the noise suppression unit configured to suppress the noise caused by the green light generated due to the first light 30.

With this configuration, like the underwater optical wireless communication device (first communication device 1), it is possible to provide the underwater optical wireless communication system 100 capable of suppressing the decrease in communication accuracy caused by the green light due to the green light other than the second light 31 which is green light received from the communication partner (second communication device 2).

Further, in the above-described embodiment, the following further effects can be obtained by the following configuration.

That is, in this embodiment, as described above, the noise suppression unit includes at least one of the green light noise removal unit 12*a* for removing the green light noise which is noise caused by the green light generated due to the first light 30 and the green light noise generation suppression unit 12*b* for suppressing the generation of the green light noise.

Thus, for example, in a case where the noise suppression unit includes the green light noise removal unit 12*a*, even when the green light noise is generated due to the light received by the first light receiver 11, the green light noise is removed by the green light noise removal unit 12*a*, and therefore, it is possible to prevent the communication accuracy of the second light 31 from decreasing due to the green light noise. Further, for example, in a case where the noise suppression unit includes the green light noise generation suppression unit 12*b*, the generation of the green light noise is suppressed by the green light noise generation suppression unit 12*b*, and therefore, the quantity of the green light noise can be reduced. Consequently, an increase in the ratio of the green light noise to the second light 31 can be suppressed.

Further, in this embodiment, as described above, the green light noise includes at least one of the green noise light 50*a* which is the green light generated due to the first light 30 and the green light noise signal 50*b* in which the green light noise is converted to an electric signal by the first light receiver 11. The green light noise removal unit 12*a* includes at least one of the green light noise signal removal circuit 120 for electrically removing the green light noise signal 50*b* and the green noise light removal filter 121 for optically removing the green noise light 50*a*.

With this configuration, for example, in a case where the green light noise includes the green light noise signal 50*b*, and the green light noise removal unit 12*a* includes the green light noise signal removal circuit 120, even in a case where the light received by the first light receiver 11 includes the green noise light 50*a*, the green light noise signal 50*b* is removed by the green light noise signal removal circuit 120. Therefore, it is possible to suppress the decrease in the communication accuracy of the second light 31 due to the green light noise signal 50*b*.

Further, for example, in a case where the green light noise includes the green noise light 50*a*, and the green light noise removal unit 12*a* includes the green noise light removal filter 121, it is possible to prevent the green noise light 50*a* from entering the first light receiver 11. Consequently, the quantity of the green light noise caused by the green noise light 50*a* can be reduced, and therefore, an increase in the ratio of the green light noise to the second light 31 can be suppressed.

Further, in this embodiment, as described above, the green noise light 50*a* is at least one of the first green noise light 51*a* which is green Raman-scattered light generated by Raman scattering in water and the second green noise light 51*b* which is green light included in the first light 30. With this configuration, it is possible to provide an underwater optical wireless communication device (first communication device 1) capable of suppressing a decrease in the communication accuracy of the second light 31 due to at least one of the first green noise light 51*a* and the second green noise light 51*b* causing green light noise.

Further, in this embodiment, as described above, the green light noise signal removal circuit 120 is configured to remove the green light noise signal 50*b* based on the first green noise light 51*a* included in the light-receiving signal 33 in the first light receiver 11, based on the driving signal 32 when the first light emitter 10 emits the first light 30.

With this configuration, even in a case where the green light noise signal 50*b* is included in the light-receiving signal 33, the green light noise signal 50*b* is removed by the green light noise signal removal circuit. Therefore, even in a case where the first green noise light 51*a* enters the first light receiver 11, it is possible to suppress a decrease in the communication accuracy of the second light 31 due to the green light noise signal 50*b* based on the first green noise light 51*a*.

Further, in this embodiment, as described above, the green light noise signal removal circuit 120 is configured to, at the time of calibration in a state in which the first light receiver 11 is not receiving the second light 31, acquire the compensation signal 34 which is an electric signal of light received the first light receiver 11 when the first light emitter 10 emits the first light 30 and the time (delayed time 35) required from the time when the driving signal 32 is output to the time when the compensation signal 34 is input, and remove the green light noise signal 50*b* by the delayed compensation signal 34 by the time required for the compensation signal 34 is input.

With this configuration, it is possible to easily remove the green light noise signal 50*b* by the compensation signal 34 acquired at the time of calibration and the delay time 35 when the first communication device 1 and the second communication device 2 communicate with each other.

Further, as described above, in this embodiment, it is further provided with the first optical path forming member 18*a* for holding the first light emitter 10 and forming the first optical path which is an optical path for the first light 30. The green noise light removal filter 121 is arranged at the post-stage of the first light emitter 10 in the first optical path forming member 18*a* and is configured to selectively transmit the first light 30 without transmitting the second the green noise light 51*b*.

With this configuration, it is possible to suppress the second green noise light 51*b* from being emitted from the first optical path forming member 18*a*. Therefore, it is possible to prevent the second green noise light 51*b* from being emitted (or scattered) in the water or in the first communication device 1 and being emitted onto the second light receiver 21. As a consequence, the quantity of green light noise caused by the second green noise light 51*b* can be reduced, and therefore, an increase in the ratio of the green light to the second light 31 can be suppressed.

Further, in this embodiment, as described above, it is further provided with the absorptive green transmission filter 15 arranged at the pre-stage of the first light receiver 11 and configured to selectively transmit the light including the light of the wavelength band of the second light 31 and not including the light of a predetermined wavelength band of the first light 30 by absorbing the light of the wavelength band of the first light, and the second optical path forming member 122 configured to hold the first light receiver 11 and form the second light path which is an optical path for the second light 31. The green noise light 50*a* is at least one of the third green noise light 51*c* which is green fluorescence emitted from the resin member 3 when the first light 30 is emitted to the resin member 3 and the fourth green noise light 51*d* which is green fluorescence emitted from the resin member 3 when the first light 30 is emitted to the absorptive green transmission filter 15.

With this, it is possible to provide an underwater optical wireless communication device (first communication device 1) capable of suppressing an increase in the ratio of green light noise to the second light 31 due to at least one of the third green noise light 51*c* and the fourth green noise light 51*d* causing green light noise.

Further, in this embodiment, as described above, the green light noise generation suppression unit 12*b* includes the third green light noise generation suppression unit that suppresses the generation of the third green noise light 51*c* due to the first light 30 emitted to the second optical path forming member 122.

Here, in a case where the second optical path forming member 122 does not include the third green light noise generation suppression unit, such as formed by a resin member 3, it emits the third green noise light 51*c* that is green fluorescence when being irradiated with the first light 30. Therefore, the third green noise light 51*c* emitted from the resin material to the first light receiver 11 becomes noise, which increases the ratio of the green light noise to the second light 31.

Therefore, as described above, since the second optical path forming member 122 includes the third green noise light suppressing unit, even when the second optical path forming member 122 is irradiated with the first light 30, it is possible to suppress the generation of the third green noise light 51*c* from the second optical path forming member 122. Consequently, it is possible to suppress the generation of the third green noise light 51*c* that becomes noise from the second optical path forming member 122, and therefore, it is possible to suppress an increase in the green light noise to the second light 31.

Further, in this embodiment, as described above, the third green light noise generation suppression unit is the second optical path forming member 122 formed of a metal material. Here, a metal material is less likely to generate green fluorescence even when irradiated with the first light 30 that is blue light. Therefore, as described above, by forming the second optical path forming member 122 by a metal material, it is possible to easily suppress the generation of fluorescence from the second optical path forming member 122 even when the second optical path forming member 122 is irradiated with the first light 30.

In this embodiment, as described above, the green light noise generation suppression unit 12*b* includes the fourth green light noise generation suppression member that suppresses the generation of the fourth green noise light 51*d* due to the first light 30 emitted to the absorptive green transmission filter 15. With this, since fourth the green noise light generation suppressing member suppresses the generation of the fourth green noise light 51*d* from the absorptive green transmission filter 15, it is possible to suppress an increase in the ratio of the green light noise to the second light 31 due to the fourth green noise light 51*d*.

Further, in this embodiment, as described above, the absorptive green transmission filter 15 is arranged at the pre-stage of the first light receiver 11 and is configured to absorb the light of a wavelength shorter than that of the second wavelength 41 in the second optical path forming member 122. The fourth green light noise generation suppression member is the reflective green transmission filter 123 arranged at the pre-stage of the absorptive green transmission filter 15 in the second optical path forming member 122 and configured to selectively transmit the light of a predetermined wavelength band not including the wavelength band of the first light 30 by reflecting the light of the wavelength band of the first light 30.

As a result, since the reflective green transmission filter 123 is arranged at the pre-stage of the absorptive green transmission filter 15, it is possible to prevent the absorptive green transmission filter 15 from being irradiated with the light of the wavelength band of the first light 30. Consequently, it is possible to easily suppress the generation of the fourth green noise light 51*d* from the absorptive green transmission filter 15.

Further, as described above, in this embodiment, it is further provided with a pair of reflective green transmission filter holding members 124 each formed in a U-shape in cross-section and configured to hold the reflective green transmission filter 123 by sandwiching the reflective green transmission filter 123. The pair of reflective green transmission filter holding members 124 is each configured such that the region 70 overlapping each other when viewed from the side surface 123*a* of the reflective green transmission filter 123 can be formed.

Thus, for example, even in the case of fixing the pair of reflective green transmission filter holding members 124 with the adhesive 126 applied to the region 70 when holding the reflective green transmission filter 123 by the pair of reflective green transmission filter holding members 124, it is possible to prevent the adhesive 126 from being irradiated with the first light 30. Consequently, it is possible to prevent the generation of green fluorescence due to the adhesive 126 for fixing the pair of reflective green transmission filter holding members 124.

Modified Embodiments

It should be understood that the embodiments disclosed here are examples in all respects and are not restrictive. The scope of the present invention is shown by the scope of the claims rather than the descriptions of the embodiments described above, and includes all changes (modifications) within the meaning of equivalent and the scope of claims.

For example, in the above-described embodiment, an example is shown in which the noise suppression unit includes both the green light noise removal unit 12*a* and the green light noise generation suppression unit 12*b*, but the present invention is not limited thereto. For example, it is enough that the noise suppression unit includes either the green light noise removal unit 12*a* or the green light noise generation suppression unit 12*b*. However, in a case where the noise suppression unit is configured to include only one of the green light noise removal unit 12*a* and the green light noise generation suppression unit 12*b*, the communication accuracy of the second light 31 is reduced due to the green light noise as compared with the case in which the noise suppression unit includes both the green light noise removal unit 12*a* and the green light noise generation suppression unit 12*b*. Accordingly, the noise suppression unit preferably includes both the green light noise removal unit 12*a* and the green light noise generation suppression unit 12*b*.

Further, in the above-described embodiment, an example is shown in which the green light noise includes both the green noise light 50*a* and the green light noise signal 50*b*, and the green light noise removal unit 12*a* is provided with both the green light noise signal removal circuit 120 and the green noise light removal filter 121, but the present invention is not limited thereto. The green light noise removal unit 12*a* may not be provided with both the green light noise signal removal circuit 120 and the green noise light removal filter 121. When the green light noise is only the green noise light 50*a*, it is enough that the green light noise removal unit 12*a* is provided with the green noise light removal filter 121. Further, in a case where the green light noise includes the green light noise signal 50*b*, it is enough that the green light noise removal unit 12*a* is provided with the green light noise signal removal circuit 120.

Further, in the above-described embodiment, an example is shown in which the green noise light 50*a* includes both the first green noise light 51*a* and the second green noise light 51*b*, but the present invention is not limited thereto. As the green noise light 50*a*, only the first green noise light 51*a* may be included. Also, as the green noise light 50*a*, only the second green noise light 51*b* may be included. In a case where the green noise light 50*a* includes only the first green noise light 51*a*, the green light noise removal unit 12*a* may include the green light noise signal removal circuit 120. In a case where the green noise light 50*a* includes only the second green noise light 51*b*, it is enough that the green light noise removal unit 12*a* includes the green noise light removal filter 121.

In the above-described embodiment, an example is shown in which the green light noise signal removal circuit 120 removes the green light noise signal 50*b* from the light-receiving signal 33, based on the driving signal 32, but the present invention is not limited thereto. As long as the green light noise signal 50*b* can be removed from the light-receiving signal 33, the green light noise signal removal circuit 120 may be configured in any manner.

Further, in the above-described embodiment, an example is shown in which the green noise light 50*a* includes both the third green noise light 51*c* and the fourth green noise light 51*d*, and the green light noise generation suppression unit 12*b* includes both the second optical path forming member 122 and the reflective green transmission filter 123, but the present invention is not limited thereto.

For example, in a case where as the green noise light 50*a*, only the third green noise light 51*c* is generated, the green light noise generation suppression unit 12*b* may include only the second optical path forming member 122 formed of a metal material. Further, in a case where only the fourth green noise light 51*d* is generated as the green noise light 50*a*, the green light noise generation suppression unit 12*b* may include only the reflective green transmission filter 123.

However, in a case where the second optical path forming member 122 is a plastic material, the third green noise light 51*c* is generated when the blue light radiation, such as, e.g., the first light 30 is applied. Further, in a case where the absorptive green transmission filter 15 is arranged at the pre-stage of the first light receiver 11, when the absorptive green transmission filter 15 is irradiated with blue light, such as, e.g., the first light 30, the fourth green noise light 51*d* is generated. Accordingly, the green light noise generation suppression unit 12*b* preferably includes both the second optical path forming member 122 made of a metal material and the reflective green transmission filter 123.

In the above-described embodiment, an example is shown in which the first optical path forming member 18*a* and the second optical path forming member 122 are formed of an aluminum material as a metal material, but the present invention is not limited thereto. For example, the first optical path forming member 18*a* and the second optical path forming member 122 may be made of a metal material other than an aluminum material. However, from the viewpoint of weight, workability, and the like, the first optical path forming member 18*a* and the second optical path forming member 122 are preferably made of aluminum.

Further, in the above-described embodiment, a configuration example is shown in which one reflective green transmission filter 123 is provided at the pre-stage of the absorptive green transmission filter 15, but the present invention is not limited thereto. For example, a plurality of reflective green transmission filters 123 may be provided at the pre-stage of the absorptive green transmission filter 15. For example, two reflective green transmission filters 123 may be provided as the plurality of reflective green transmission filters 123.

Further, in the above-described embodiment, a configuration example is shown in which the reflective green transmission filter holding member 124 is a pair of holding members each having a U-shape in cross-section, but the present invention is not limited thereto. As long as the generation of green fluorescence due to the first light 30 can be suppressed when fixing the reflective green transmission filter 123, the form, etc., of the reflective green transmission filter holding member 124 is not limited.

Further, it should be noted that optical properties, such as, e.g., the wavelength band and the transmittance, of the first light emitter 10, the second light emitter 20, the absorptive green transmission filter 15, the reflective blue transmission filter 25, the green noise light removal filter 121, and the reflective green transmission filter 123 described in the above-described embodiments, are merely examples, and are not limited to the above-described optical properties.

Further, in the above-described embodiment, an example is shown in which the second communication device 2 is provided to the fixed body 81, but the present invention is not limited thereto. For example, the second communication device 2 may be provided to a moving body that differs from the moving body 80 in which the first communication device 1 is provided.

[Aspects]

It will be appreciated by those skilled in the art that the above-described exemplary embodiments are illustrative of the following aspects.

(Item 1)

An underwater optical wireless communication device for underwater optical wireless communication, comprising:
a light emitter configured to emit first light having a first wavelength included in a blue wavelength band as a center wavelength;
a light receiver configured to receive second light in which a second wavelength included in a green wavelength band is a center wavelength; and
a noise suppression unit configured to suppress noise caused by green light generated due to the first light.

(Item 2)

The underwater optical wireless communication device as recited in the above-described Item 1,
wherein the noise suppression unit includes at least one of a green light noise removal unit for removing green light noise which is noise caused by green light generated due to the first light and a green light noise generation suppression unit for suppressing generation of the green light noise.

(Item 3)

The underwater optical wireless communication device as recited in the above-described Item 2,
wherein the green light noise includes at least one of green light generated due to the first light and a green noise signal acquired by converting the green noise light into an electric signal by the light receiver, and
wherein the green light noise removal unit includes at least one of a green light noise signal removal circuit for electrically removing the green light noise signal and a green noise light removal filter for optically removing the green noise light.

(Item 4)

The underwater optical wireless communication device as recited in the above-described Item 3,
wherein the green noise light is at least one of first green noise light which is a green Raman scattered light generated by Raman scattering of the first light in water and second green noise light which is a green light included in the first light.

(Item 5)

The Underwater optical wireless communication device as recited in the above-described Item 4,
wherein the green light noise signal removal circuit is configured to remove the green light noise signal based on the first green noise light included in a light-receiving signal in the light receiver, based on a driving signal when the light emitter emits the first light.

(Item 6)

The underwater optical wireless communication device as recited in the above-described Item 5, wherein the green light noise signal removal circuit is configured to acquire a compensation signal which is an electric signal of light received by the light receiver when the light receiver received the first light and a time required for the compensation signal to be input from when the driving signal is output at a time of calibration in a state in which the light receiver is not receiving the second light, and remove the green light noise signal by the compensation signal delayed by a time required for the compensation signal is input.

(Item 7)

The underwater optical wireless communication device as recited in any one of the above-described Items 4 to 6, further comprising:

a first optical path forming member configured to hold the light emitter and form a first optical path that is an optical path of the first light, wherein the green noise light removal filter is arranged at a post-stage of the light emitter and is configured to selectively transmit the first light, in the first optical path forming member.

(Item 8)

The underwater optical wireless communication device as recited in any one of the above-described Items 3 to 7, further comprising:

a light absorptive green transmission filter arranged at a pre-stage of the light receiver, the light absorptive green transmission filter being configured to absorb light in a wavelength band of the first light to selectively transmit light including light in a wavelength band of the second light and not including light in a predetermined wavelength band of the first light; and a second optical path forming member configured to hold the light receiver and form a second optical path that is an optical path of the second light;

wherein the green noise light is at least one of third green noise light and fourth green noise light, the third green noise being green fluorescence emitted from a resin member when the first light is emitted to the resin member, the fourth green noise light being green fluorescence emitted from the absorptive green transmission filter when the first light is emitted to the absorptive green transmission filter.

(Item 9)

The underwater optical wireless communication device as recited in the above-described Item 8, wherein the green light noise generation suppression unit includes a third green light noise generation suppression unit configured to suppresses generation of the third green noise light due to the first light emitted to the second optical path forming member.

(Item 10)

The underwater optical wireless communication device as recited in the above-described Item 9, wherein the third green light noise generation suppression unit is the second optical path forming member made of a metal material.

(Item 11)

The underwater optical wireless communication device as recited in any one of the above-described Items 8 to 10, wherein the green light noise generation suppression unit includes a fourth green light noise generation suppression member configured to suppress generation of the fourth green noise light due to the first light emitted to the absorptive green transmission filter.

(Item 12)

The underwater optical wireless communication device as recited in the above-described Item 11, wherein the absorptive green transmission filter is arranged at a pre-stage of the light receiver in the second optical path forming member and is configured to absorb light of a wavelength shorter than that of the second wavelength, and wherein the fourth green light noise generation suppression member is a reflective green transmission filter arranged at a pre-stage of the absorptive green transmission filter in the second optical path forming member, the fourth green light noise generation suppression member being configured to reflect light in a wavelength band of the first light to thereby selectively transmit light in a predetermined wavelength band not including a wavelength band of the first light.

(Item 13)

The underwater optical wireless communication device as recited in the above-described Item 12, further comprising:

a pair of reflective green transmission filter holding members each having a U-shape in cross-section, the pair of reflective green transmission filter holding members being configured to hold the reflective green transmission filter by sandwiching the reflective green transmission filter, wherein the pair of reflective green transmission filter holding members is configured to be capable of forming regions overlapping each other when viewed from a side direction of the reflective green transmission filter.

(Item 14)

An underwater optical wireless communication system comprising for underwater optical wireless communication, comprising:

a first underwater optical wireless communication device configured to emit first light having a first wavelength included in a blue wavelength band as a center wavelength and emit second light in which a second wavelength included in a green wavelength band is a center wavelength, wherein first wavelength included in and of first emits center wavelength light of first light, and a second underwater optical wireless communication device configured to emit the second light and receives the first light, wherein the first underwater optical wireless communication device includes a light emitter configured to emit the first light, a light receiver configured to receive the second light, and a noise suppression unit configured to suppresses noise caused by green light generated due to the first light.

The invention claimed is:

1. An underwater optical wireless communication device for underwater optical wireless communication, comprising:

a light emitter configured to emit first light having a first center wavelength included in a blue wavelength band;

a light receiver configured to receive second light having a second center wavelength included in a green wavelength band; and a noise suppression unit configured to suppress noise having a wavelength that is the second center wavelength included in the green wavelength band and caused by the light emitter;

wherein the noise is at least one of first green noise light, second green noise light, third green noise light, and fourth green noise light, wherein the first green noise light is green Raman scattered light generated by Raman scattering of the first light in water, wherein the second green noise light is green light emitted by the light emitter and included in the first light, wherein the third green noise light is green fluorescence emitted from a resin member in a case where an absorptive green transmission filter is arranged at a pre-stage of the light receiver when the first light is incident upon the resin member, and wherein the fourth green noise light is green fluorescence emitted from the absorptive green transmission filter in a case where the resin member is provided when the first light is incident upon the absorptive green transmission filter.

2. The underwater optical wireless communication device as recited in claim 1, wherein the noise suppression unit includes at least one of a green light noise removal unit for removing green light noise in the green wavelength band and a green light noise generation suppression unit for suppressing generation of the green light noise.

3. The underwater optical wireless communication device as recited in claim 2, wherein the light receiver is further configured to convert the received second light into an electrical signal, wherein the green light noise includes at least one of green noise light and a green light noise signal acquired by converting the green noise light into an electric signal by the light receiver, and wherein the green light noise removal unit includes at least one of a green light noise signal removal circuit configured to electrically remove the green light noise signal and a green noise light removal filter configured to optically remove the green noise light.

4. The underwater optical wireless communication device as recited in claim 3, wherein the green noise light is at least one of the first green noise light and the second green noise light.

5. The underwater optical wireless communication device as recited in claim 4, wherein the light emitter is configured to receive a driving signal causing the light emitter to emit the first light, and wherein the green light noise signal removal circuit is configured to remove the green light noise signal based on the first green noise light included in a light-receiving signal in the light receiver, and based on the driving signal received by the light emitter.

6. The underwater optical wireless communication device as recited in claim 5, wherein the green light noise signal removal circuit is configured to:

acquire a predetermined compensation signal which is an electric signal of light received by the light receiver when the light receiver received the first green noise light, acquire a predetermined delay time required for between receipt of the predetermined compensation signal and receipt of the driving signal by the light emitter, at a time of calibration in a state in which the light receiver is not receiving the second light, and remove the green light noise signal by the predetermined compensation signal delayed by the predetermined delay time.

7. The underwater optical wireless communication device as recited in claim 4, further comprising:

a first optical path forming member configured to hold the light emitter and form a first optical path that is an optical path for the first light, wherein the green light noise removal unit includes the green noise light removal filter, and wherein the green noise light removal filter is arranged at a post-stage of the light emitter in the first optical path forming member and is configured to selectively transmit the first light without transmitting the second green noise light.

8. The underwater optical wireless communication device as recited in claim 3, further comprising:

a second optical path forming member including the resin member and configured to hold the light receiver and form a second optical path that is an optical path for the second light, wherein the green noise light is at least one of the third green noise light and the fourth green noise light.

9. The underwater optical wireless communication device as recited in claim 8, wherein the green light noise generation suppression unit includes a second green light noise generation suppression unit configured to suppress generation of the third green noise light due to the first light incident on the second optical path forming member.

10. The underwater optical wireless communication device as recited in claim 9, wherein the second green light noise generation suppression unit is the second optical path forming member made of a metal material.

11. The underwater optical wireless communication device as recited in claim 9, wherein the green light noise generation suppression unit includes a third green light noise generation suppression member configured to suppress generation of the fourth green noise light due to the first light incident on the absorptive green transmission filter.

12. The underwater optical wireless communication device as recited in claim 11, wherein the absorptive green transmission filter is configured to absorb light of a wavelength shorter than the second center wavelength, and wherein the third green light noise generation suppression member is a reflective green transmission filter arranged at a pre-stage of the absorptive green transmission filter in the second optical path forming member, the third green light noise generation suppression member being configured to reflect light of a wavelength band of the first light to selectively transmit light of a predetermined wavelength band not including a wavelength band of the first light.

13. The underwater optical wireless communication device as recited in claim 12, further comprising:

a pair of reflective green transmission filter holding members each having a U-shape in cross-section, the pair of reflective green transmission filter holding members being configured to hold the reflective green transmission filter by sandwiching the reflective green transmission filter, wherein the pair of reflective green transmission filter holding members is configured to be capable of forming regions overlapping each other when viewed from a side of the reflective green transmission filter.

14. An underwater optical wireless communication system for underwater optical wireless communication, comprising:

a first underwater optical wireless communication device configured to emit first light having a first center wavelength included in a blue wavelength band and receive second light having a second center wavelength included in a green wavelength band; and a second underwater optical wireless communication device configured to emit the second light and receive the first light, wherein the first underwater optical wireless communication device includes:

a light emitter configured to emit the first light, a light receiver configured to receive the second light, a noise suppression unit configured to suppress noise having a wavelength that is the second center wavelength included in the green wavelength band and caused by the light emitter;

wherein the noise is at least one of first green noise light, second green noise light, third green noise light, and fourth green noise light, wherein the first green noise light is green Raman scattered light generated by Raman scattering of the first light in water, wherein the second green noise light is green light emitted by the light emitter and included in the first light, wherein the third green noise light is green fluorescence emitted from a resin member in a case where an absorptive green transmission filter is arranged at a pre-stage of the light receiver when the first light is incident upon the resin member, and wherein the fourth green noise light is green fluorescence emitted from the absorptive green transmission filter in a case where the resin member is provided when the first light is incident upon the absorptive green transmission filter.

* * * * *